US012801452B2

(12) United States Patent
Sriramoju et al.

(10) Patent No.: US 12,801,452 B2
(45) Date of Patent: Nov. 17, 2026

(54) ORCHESTRATION OF TASKS IN TENANT CLOUDS SPANNING MULTIPLE CLOUD INFRASTRUCTURES

(71) Applicant: Nutanix, Inc., San Jose, CA (US)

(72) Inventors: Abhinay Vishwakarma Sriramoju, Mancherial (IN); Gaurav Kumar, Bangalore (IN); Siddharth Kulshrestha, Jaipur (IN); Srinath Gantloor Sridhar, Bangalore (IN)

(73) Assignee: NUTANIX, INC., San Jose, CA (US)

( * ) Notice: Subject to any disclaimer, the term of this patent is extended or adjusted under 35 U.S.C. 154(b) by 686 days.

(21) Appl. No.: 17/651,236

(22) Filed: Feb. 15, 2022

(65) Prior Publication Data

US 2023/0214273 A1 Jul. 6, 2023

(30) Foreign Application Priority Data

Jan. 4, 2022 (IN) ............................. 202241000379

(51) Int. Cl.
*G06F 9/50* (2006.01)

(52) U.S. Cl.
CPC .......... *G06F 9/5072* (2013.01); *G06F 9/5038* (2013.01); *G06F 9/505* (2013.01)

(58) Field of Classification Search
CPC ....... G06F 9/5072; G06F 9/5038; G06F 9/505
See application file for complete search history.

(56) References Cited

U.S. PATENT DOCUMENTS

| | | | | |
|---|---|---|---|---|
| 8,549,518 | B1 | 10/2013 | Aron et al. | |
| 8,601,473 | B1 | 12/2013 | Aron et al. | |
| 8,850,130 | B1 | 9/2014 | Aron et al. | |
| 9,772,866 | B1 | 9/2017 | Aron et al. | |
| 11,144,363 | B1 * | 10/2021 | Francis Conde ..... | G06F 9/4843 |
| 12,155,731 | B2 | 11/2024 | Joshi et al. | |
| 2011/0276977 | A1 * | 11/2011 | van Velzen ........... | G06F 9/5083 718/104 |
| 2012/0311154 | A1 * | 12/2012 | Morgan ................ | G06F 9/5072 709/226 |
| 2014/0280948 | A1 * | 9/2014 | Schmidt .............. | H04L 63/0272 709/226 |

(Continued)

OTHER PUBLICATIONS

Poitras, Steven. "The Nutanix Bible" (Oct. 15, 2013), from stevenpoitras.com/the-nutanix-bible/ (Publication date based on indicated capture date by Archive.org; first publication date unknown); pp. all.

(Continued)

*Primary Examiner* — Aimee Li
*Assistant Examiner* — Harrison Li
(74) *Attorney, Agent, or Firm* — IPHORIZONS PLLC; Narendra Reddy Thappeta

(57) ABSTRACT

Aspects of the present disclosure are directed to orchestration of tasks in tenant clouds. In an embodiment, an orchestrator receives a task-group and a condition, with the task-group specifying multiple tasks. The orchestrator selects a group of resources satisfying the condition, with the group of resources being of a tenant cloud spanning multiple cloud infrastructures. The orchestrator invokes the task-group on the group of resources to cause each of the multiple tasks to be executed on each of the group of resources.

23 Claims, 20 Drawing Sheets

(56) References Cited

U.S. PATENT DOCUMENTS

| | | | | |
|---|---|---|---|---|
| 2016/0191345 | A1* | 6/2016 | Despotovic | H04L 67/51 709/226 |
| 2020/0004618 | A1 | 1/2020 | Thornhill et al. | |
| 2020/0034484 | A1 | 1/2020 | Arora et al. | |
| 2020/0195524 | A1* | 6/2020 | Clow | H04L 41/5041 |
| 2020/0379816 | A1* | 12/2020 | Lin | G06F 9/5072 |
| 2021/0112128 | A1 | 4/2021 | Joshi et al. | |
| 2021/0176122 | A1* | 6/2021 | Bregman | H04W 24/04 |
| 2022/0214927 | A1* | 7/2022 | Gong | G06F 9/5027 |

OTHER PUBLICATIONS

Poitras, Steven. "The Nutanix Bible" (Jan. 11, 2014), from stevenpoitras.com/the-nutanix-bible/ (Publication date based on indicated capture date by Archive.org; first publication date unknown); pp. all.

Poitras, Steven. "The Nutanix Bible" (Jun. 20, 2014), from stevenpoitras.com/the-nutanix-bible/ (Publication date based on indicated capture date by Archive.org; first publication date unknown); pp. all.

Poitras, Steven. "The Nutanix Bible" (Jan. 7, 2015), from stevenpoitras.com/the-nutanix-bible/ (Publication date based on indicated capture date by Archive.org; first publication date unknown); pp. all.

Poitras, Steven. "The Nutanix Bible" (Jun. 9, 2015), from stevenpoitras.com/the-nutanix-bible/ (Publication date based on indicated capture date by Archive.org; first publication date unknown); pp. all.

Poitras, Steven. "The Nutanix Bible" (Sep. 4, 2015), from nutanixbible.com/ pp. all.

Poitras, Steven. "The Nutanix Bible" (Jan. 12, 2016), from nutanixbible.com/ pp. all.

Poitras, Steven. "The Nutanix Bible" (Jun. 9, 2016), from nutanixbible.com/ pp. all.

Poitras, Steven. "The Nutanix Bible" (Jan. 3, 2017), from nutanixbible.com/ pp. all.

Poitras, Steven. "The Nutanix Bible" (Jun. 8, 2017), from nutanixbible.com/ pp. all.

Poitras, Steven. "The Nutanix Bible" (Jan. 3, 2018), from nutanixbible.com/ pp. all.

Poitras, Steven. "The Nutanix Bible" (Jun. 25, 2018), from nutanixbible.com/ pp. all.

Poitras, Steven. "The Nutanix Bible" (Jan. 8, 2019), from nutanixbible.com/ pp. all.

Poitras, Steven. "The Nutanix Bible" (Jul. 25, 2019), from nutanixbible.com/ pp. all.

Poitras, Steven. "The Nutanix Bible" (Sep. 17, 2019), from nutanixbible.com/ pp. all.

Cano, Ignacio et al. "Curator: Self-Managing Storage for Enterprise Clusters"; University of Washington; published Mar. 2017; pp. all.

What is an Ansible playbook, redhat.com/en/topics/automation/what-is-an-ansible-playbook, published on Jan. 8, 2019, 08 Pages.

Create a new Inventory and add it to the Organization, docs.ansible.com/ansible-tower/latest/html/quickstart/create_inventory.html, downloaded circa_Jan. 13, 2022, 03 Pages.

Inventories, docs.ansible.com/ansible-tower/latest/html/userguide/inventories.html, downloaded circa Jan. 17, 2022, 35 Pages.

Using VMware dynamic inventory plugin—Filters, docs.ansible.com/ansible/latest/collections/community/vmware/docsite/vmware_scenarios/vmware_inventory_filters.html downloaded circa Jan. 13, 2022, 06 Pages.

Pratap Pratihar, Ansible inventory made easy, published in Walmart Global Tech Blog, medium.com/walmartglobaltech/ansible-inventory-made-easy-359e159783eb, published on Aug. 11, 2020, 10 Pages.

Discovering variables: facts and magic variables, docs.ansible.com/ansible/latest/user_guide/playbooks_vars_facts.html#caching-facts, downloaded circa Jan. 17, 2022, 16 Pages.

Conditionals, docs.ansible.com/ansible/latest/user_guide/playbooks_conditionals.html#playbooks-conditionals, downloaded circa Jan. 17, 2022, 13 Pages.

ansible.utils.update_fact—Update currently set facts, docs.ansible.com/ansible/latest/collections/ansible/utils/update_fact_module.html, downloaded circa Jan. 17, 2022, 07 Pages.

Can ansible fetch updated facts in middle of a playbook, stackoverflow.com/questions/35185635/can-ansible-fetch-updated-facts-in-middle-of-a-playbook, downloaded circa Jan. 17, 2022, 02 Pages.

Controlling playbook execution: strategies and more, docs.ansible.com/ansible/latest/user_guide/playbooks_strategies.html, downloaded circa Jan. 18, 2022, 07 Pages.

Openstack compute(nova), docs.openstack.org/nova/latest/, downloaded circa Jan. 13, 2022, 04 Pages.

Compute schedulers, docs.openstack.org/nova/latest/admin/scheduling.html#writing-your-own-filter, downloaded circa Jan. 13, 2022, 16 Pages.

Filter by Host Aggregate Metadata or by Image Extra Specs, intel.com/content/www/us/en/developer/articles/technical/filter-by-host-aggregate-metadata-or-by-image-extra-specs.html, published on Jan. 4, 2017, 05 Pages.

Filter Resource Provider List for Traits, specs/rocky/implemented/traits-on-list-resource-providers.html, downloaded circa Jan. 13, 2022, 03 Pages.

Automation Hybrid Runbook Worker overview, docs.microsoft.com/en-us/azure/automation/automation-hybrid-runbook-worker, published on Nov. 11, 2021, 10 Pages.

Use Azure Private Link to securely connect networks to Azure Automation, docs.microsoft.com/en-us/azure/automation/how-to/private-link-security, published on Nov. 13, 2021, 10 Pages.

Azure Instance Metadata Service (Windows), docs.microsoft.com/en-us/azure/virtual-machines/windows/instance-metadata-service?tabs=windows, published on Aug. 23, 2021, 42 Pages.

Start/Stop VMs during off-hours overview, docs.microsoft.com/en-us/azure/automation/automation-solution-vm-management, published on Nov. 2, 2021, 13 Pages.

Data Handling in the Hybrid Model, docs.prefect.io/orchestration/faq/dataflow.html#how-is-data-persisted, downloaded circa Jan. 13, 2022, 03 Pages.

Nikolay Vaklinov, Prefect Workflow Automation with Azure DevOps and AKS, infinitelambda.com/post/prefect-workflow-automation-azure-devops-aks/, published on Feb. 5, 2021, 12 Pages.

Working with runbooks, docs.aws.amazon.com/systems-manager/latest/userguide/automation-documents.html, downloaded circa Jan. 13, 2022, 02 Pages.

Dell Hybrid Cloud System for Microsoft Cloud Platform System (CPS) Standard, Version 1.1 Administrators Guide, based on release 1603, downloads.dell.com/manuals/all-products/esuprt_ser_stor_net/esuprt_engi_soln/esuprt msft-cld-sitn/dell-hybrid-cloud-system-microsoft_administrator%20quide4_en-us.pdf published on Jun. 2016, 158 Pages.

About VM metadata, cloud.google.com/compute/docs/metadata/overview, downloaded circa Jan. 13, 2022, 04 Pages.

Default VM metadata values, cloud.google.com/compute/docs/metadata/default-metadata-values, downloaded circa Jan. 13, 2022, 09 Pages.

Managing a Hybrid Infrastructure, us.nttdata.com/en/-/media/assets/white-paper/managed-cloud-managing-a-hybrid-infrastructure-pov.pdf, published on Aug. 2018, 10 Pages.

42 Poitras, Steven. "The Nutanix Bible" (Nov. 16, 2020), from nutanixbible.com/ pp. all.

* cited by examiner

500

```
{
        "_index": "ntnx_vms",
        "_type": "ntnx_vms",
502 →   "_id": "0b748c55-87d8-44f7-aae8-8f080e061277",
        "_score": 1.0,
        "_source": {
            "last_index_time": "2022-02-01T12:32:06.994081153Z",
            "account_uuid": "b2a313eb-28cd-4755-8815-4054eb7a1ffd",
            "sync_uuid": "6e991076-c0c3-4f1f-af93-280d1c31a166",
            "uuid": "0b748c55-87d8-44f7-aae8-8f080e061277",
504 →       "name": "vm-220124-084537",
505 →       "power_state": "ON",
            "num_vcpus_per_socket": 1,
            "num_sockets": 1,
506 →       "categories": {
                "CalmApplication": [
                    "app1"
                ],
                "CalmUsername": [
                    "admin"
                ],
507 →           "OSType": [
                    "Linux"
                ]
            },
508 →       "nic_list": [
                {
                    "ip_endpoint_list": [
                        {
                            "ip": "10.44.78.12",
                            "type": "LEARNED"
                        }
                    ],
                    "is_connected": true,
                    "mac_address": "50:6b:8d:a3:4a:03",
                    "nic_type": "NORMAL_NIC",
                    "subnet_reference": {
                        "kind": "subnet",
                        "name": "vlan.800",
                        "uuid": "6b37521a-bdaa-4a46-bff4-43c5d8fd03f9"
                    },
                    "trunked_vlan_list": [],
                    "uuid": "c07086d3-9d9e-46ad-9c1c-00943faf6167",
                    "vlan_mode": "ACCESS"
                }
            ],
509 →       "memory_size_bytes": 1073741824,
            "vcpu": 1,
            "account_metadata": {
                "pc_ip": "127.0.0.1",
                "port": 9440,
                "pc_uuid": "d44e9531-e916-440e-9589-8596e07750a2",
                "cluster_uuid_list": [
                    "2f066da3-a5b1-4ac1-94c5-6a09ea88a656"
                ]
            },
            "calm_managed": true
        }
    },
```

*FIG. 5A*

510

```
{
        "_index": "vmware_vms",
        "_type": "vmware_vms",
512 →   "_id": "503e7922-a8b4-a7b8-01f5-3a1f6bc3a2f8",
        "_score": 1.0,
        "_source": {
            "last_index_time": "2022-02-01T12:42:07.233718128Z",
            "account_uuid": "f03edc99-8021-4d46-9f18-210fe31597ec",
            "sync_uuid": "aa4e62c0-1642-4c46-9a62-0c065c09f7a7",
            "guest_hostname": "",
            "guest_state": "notRunning",
            "guest_ipaddress": "",
            "guest_family": "",
            "num_cpu": 2,
            "num_sockets": 2,
            "num_vcpus_per_socket": 1,
513 →       "memory_size_bytes": 2048000000,
514 →       "power_state": "poweredOff",
            "instance_uuid": "503e7922-a8b4-a7b8-01f5-3a1f6bc3a2f8",
516 →       "name": "image_abc",
            "tags": null,
518 ↗       "account_metadata": {
                "server_ip": "10.46.142.194",
                "port": 443
            },
            "calm_managed": false,
            "is_template": true
        }
    },
```

*FIG. 5B*

```
520 →
{
            "_index": "aws_vms",
            "_type": "aws_vms",
  522 →     "_id": "3c409384-2d20-46eb-be88-ac76fefe4163",
            "_score": 1.0,
            "_source": {
                "last_index_time": "2022-02-01T12:42:07.233718128Z",
                "account_uuid": "db17dc75-1ae7-4158-9b8c-5a9ea6410680",
                "sync_uuid": "aa4e62c0-1642-4c46-9a62-0c065c09f7a7",
                "num_cpu": 2,
                "num_sockets": 2,
                "num_vcpus_per_socket": 1,
  523 →         "memory_size_bytes": 2048000000,
  524 →         "power_state": "poweredOff",
                "instance_uuid": "503e7922-a8b4-a7b8-01f5-3a1f6bc3a2f8",
  526 →         "name": "aws_abc",
  527 →         "tags": null,
  528 →         "instance_type": "Linux",
                "account_metadata": {
                    "region": "region1",
                    "availability_zone": "az_1",
                    "vpc": "vpc1",
                    "security_group": "sg1"
                },
                "calm_managed": false,
                "is_template": true
            }
        },
```

*FIG. 5C*

ORCHESTRATION OF TASKS IN TENANT CLOUDS SPANNING MULTIPLE CLOUD INFRASTRUCTURES

PRIORITY CLAIM

The instant patent application is related to and claims priority from the co-pending India provisional patent application entitled, "ORCHESTRATION IN CLOUD INFRASTRUCTURE", Serial No.: 202241000379, Filed: 4 Jan. 2022, naming as inventors Sriramoju et al, which is incorporated in its entirety herewith.

The instant patent application is related to and claims priority from the co-pending India non-provisional patent application entitled, "ORCHESTRATION OF TASKS IN TENANT CLOUDS SPANNING MULTIPLE CLOUD INFRASTRUCTURES", Serial No.: 202241000379, Filed: 9 Feb. 2022, naming as inventors Sriramoju et al, which is incorporated in its entirety herewith

BACKGROUND OF THE DISCLOSURE

Technical Field

The present disclosure relates to cloud infrastructures, and more specifically to orchestration of tasks in tenant clouds spanning multiple cloud infrastructures.

Related Art

Cloud infrastructure refers to a collection of physical processing nodes, connectivity infrastructure, data storages, administration systems, etc., which are engineered to together provide a virtual computing infrastructure for various customers, with the scale of such virtual computing being specified often on demand. Examples of cloud infrastructures include Amazon Web Services (AWS) Cloud Infrastructure available from Amazon.com, Inc., Google Cloud Platform (GCP) available from Google LLC, etc., as is well known in the relevant arts.

The virtual computing infrastructure provided to each customer is normally referred to as a "cloud". The virtual infrastructure contains computing resources (e.g., virtual machines, operating systems), storage resources (e.g., database servers, file systems) and other required resources such as networking resources (e.g., connection pools, etc.). A customer/owner (also known as tenant) of a cloud may deploy desired user applications/data services on the resources provided as a part of their cloud(s), with the services capable of processing user requests received from end user systems. A cloud provisioned for a tenant is thus referred to as a "tenant cloud".

A tenant cloud is often provisioned to span multiple cloud infrastructures. Spanning multiple cloud infrastructures implies that resources of the tenant cloud would be present in each of the multiple cloud infrastructures. Thus, some VMs of a tenant cloud can be present in AWS infrastructure while some others can be present in GCP infrastructure. Typically, such provisioning is opted by tenants for reasons such as cost, performance, scalability, availability, etc.

There is often a need to execute various tasks on the resources provided in a tenant cloud. For example, a tenant may wish to perform tasks such as powering down/up a VM, upgrading the software, taking backup of data, restoring data, etc. In general, it is desirable that tenants be able to easily and accurately control execution of (i.e., orchestrate) such tasks on any desired resources. Aspects of the present disclosure are directed to such orchestration.

BRIEF DESCRIPTION OF THE DRAWINGS

Example embodiments of the present disclosure will be described with reference to the accompanying drawings briefly described below.

FIGS. 5A-5C depict portions of metadata of VMs deployed in tenant clouds in one embodiment.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE EMBODIMENTS OF THE DISCLOSURE

1. Overview

Aspects of the present disclosure are directed to orchestration of tasks in tenant clouds. In an embodiment, an orchestrator receives a task-group and a condition, with the task-group specifying multiple tasks. The orchestrator selects a group of resources satisfying the condition, with the group of resources being of a tenant cloud spanning multiple cloud infrastructures. The orchestrator invokes the task-group on the group of resources to cause each of the multiple tasks to be executed on each of the group of resources.

Another aspect of the present disclosure facilitates a user to conveniently specify the condition at a desired level of precision. The user may first specify a tentative condition, and the orchestrator immediately displays a set of resources satisfying the tentative condition, thereby enabling the user to refine the tentative condition until the condition is formulated to the user's satisfaction.

According to yet another aspect, prior to receipt of the (tentative) condition, orchestrator retrieves attribute-value pairs characterizing each of multiple resources in a first cloud infrastructure and multiple resources in a second cloud infrastructure. The retrieved attribute-value pairs are examined to select the group of resources satisfying the condition. The group of resources satisfying the condition may either be selected dynamically at the time of each invocation or determined statically when the condition is received.

In an embodiment, orchestrator retrieves the configuration information at a sequence of pre-determined time points and stores locally the attribute-value pairs. The examination of the configuration information is accordingly based on the locally stored attribute-value pairs.

According to yet another aspect, the attribute-value pairs are retrieved and stored according to conventions of respective cloud infrastructures. However, conditions are specified according to a common convention such that the user interface is convenient for the users.

According to one more aspect, additional group of resources may be specified associated with an individual task of the task-group. Accordingly, the individual task is executed only on the resources of the additional group, but not on those of the task-group.

Several aspects of the present disclosure are described below with reference to examples for illustration. However, one skilled in the relevant art will recognize that the disclosure can be practiced without one or more of the specific details or with other methods, components, materials and so forth. In other instances, well-known structures, materials, or operations are not shown in detail to avoid obscuring the features of the disclosure. Furthermore, the features/aspects described can be practiced in various combinations, though only some of the combinations are described herein for conciseness.

2. Example Environment

Figure 1:
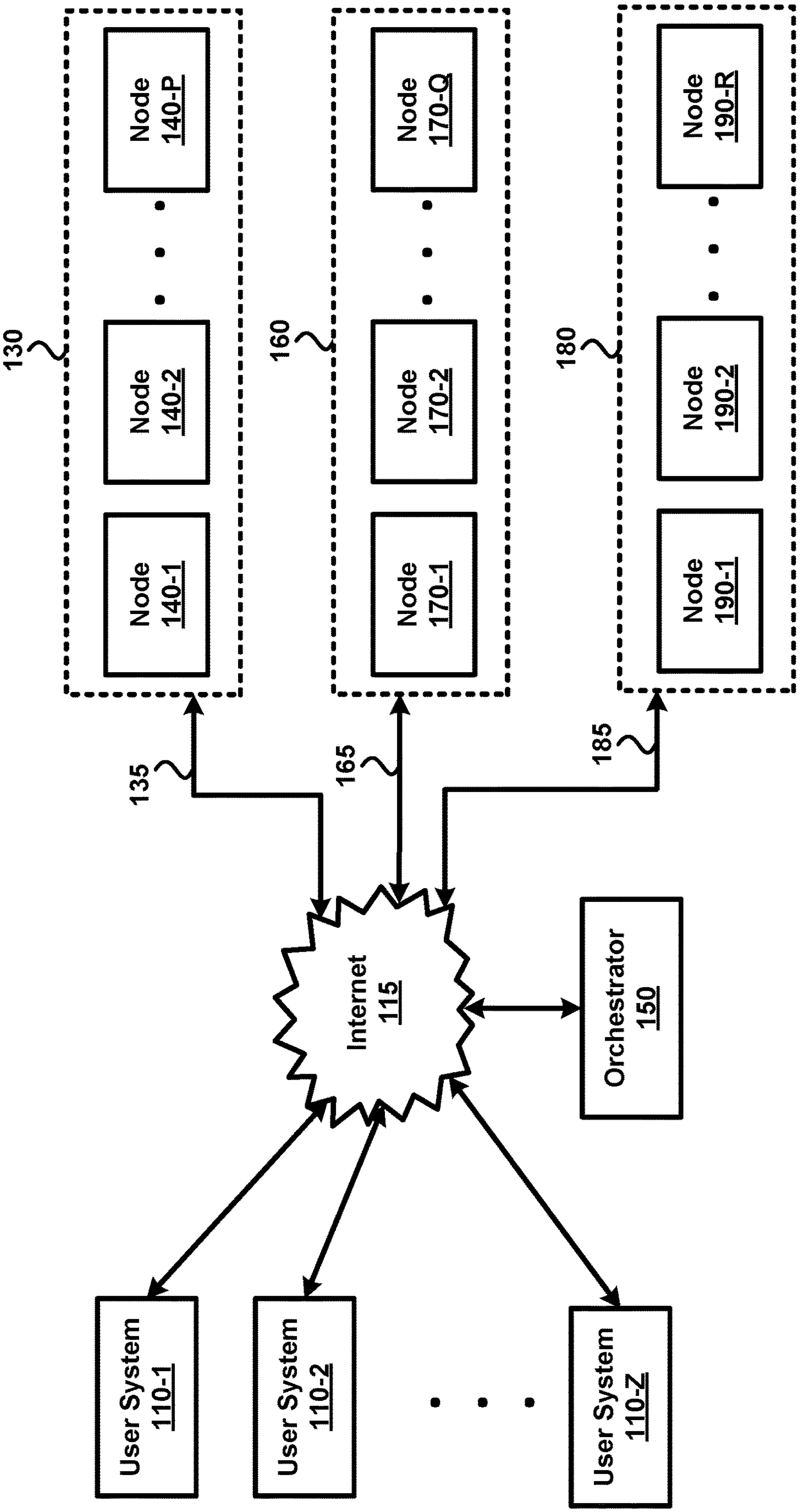
FIG. 1 is a block diagram illustrating an example environment (computing system) in which several aspects of the present invention can be implemented.

FIG. 1 is a block diagram illustrating an example environment (computing system) in which several aspects of the present invention can be implemented. The block diagram is shown containing user systems 110-1 through 110-Z (Z representing any natural number), Internet 115, orchestrator 150, and computing infrastructures 130, 160 and 180. Computing infrastructure 130 in turn is shown containing nodes 140-1 through 140-P (P representing any natural number). Computing infrastructure 160 in turn is shown containing nodes 170-1 through 170-Q (Q representing any natural number). Computing infrastructure 180 in turn is shown containing nodes 190-1 through 190-R (R representing any natural number). The user systems and nodes are collectively or individually referred to by 110, 140, 170 and 190 respectively, as will be clear from the context.

Merely for illustration, only representative number/type of systems is shown in FIG. 1. Many environments often contain many more systems, both in number and type, depending on the purpose for which the environment is designed. Each block of FIG. 1 is described below in further detail.

Each of computing infrastructures 130, 160 and 180 is a collection of physical processing nodes (140, 170 and 190), connectivity infrastructure, data storages, administration systems, etc., which are engineered to together provide a virtual computing infrastructure for various customers, with the scale of such virtual computing being specified often on demand. Computing infrastructure 130/160/180 may correspond to a public cloud infrastructure such as Amazon Web Services (AWS) Cloud available from Amazon.com, Inc., Google Cloud Platform (GCP) available from Google LLC, Azure cloud available from Microsoft, Inc., Xi cloud available from Nutanix etc. Computing infrastructure 130/160/180 may also correspond to one of the On-Premises (On-Prem) enterprise systems owned by corresponding customers.

In one embodiment, computing infrastructure 130 is On-Prem (on premises) enterprise system owned by corresponding customer, while computing infrastructures 180 and 160 are two different public cloud infrastructures (such as AWS/GCP noted above) provided by corresponding cloud infrastructure providers. Accordingly, in the following description, the terms on-prem system 130 and cloud infrastructures 160/180 are used interchangeably with computing infrastructures 130/160/180. However, aspects of the present disclosure can be implemented in other environments as well such as when 130/160/180 are all public cloud infrastructures, as will be apparent to one skilled in the relevant arts by reading the disclosure herein.

All the systems of each computing infrastructure 130/160/180 are assumed to be connected via an intranet. Internet 115 extends the connectivity of these (and other systems of the computing infrastructures) with external systems such as user systems 110 and orchestrator 150. Each of intranet and Internet 115 may be implemented using protocols such as Transmission Control Protocol (TCP) and/or Internet Protocol (IP), well known in the relevant arts.

In general, in TCP/IP environments, a TCP/IP packet is used as a basic unit of transport, with the source address being set to the TCP/IP address assigned to the source system from which the packet originates and the destination address set to the TCP/IP address of the target system to which the packet is to be eventually delivered. An IP packet is said to be directed to a target system when the destination IP address of the packet is set to the IP address of the target system, such that the packet is eventually delivered to the target system by Internet 115 and intranets. When the packet contains content such as port numbers, which specifies a target application, the packet may be said to be directed to such application as well.

Each of user systems 110 represents a system such as a personal computer, workstation, mobile device, computing tablet etc., used by users to generate (user) requests directed to enterprise/user applications executing in computing infrastructures 130/160/180. The user requests may be generated using appropriate user interfaces (e.g., web pages provided by a user application executing in a node, a native user interface provided by a portion of a user application downloaded from a node, etc.).

In general, a user system requests a user application for performing desired tasks and receives the corresponding responses (e.g., web pages) containing the results of performance of the requested tasks. The web pages/responses may then be presented to the user by local applications such as the browser. Each user request is sent in the form of an IP packet directed to the desired system or user application, with the IP packet including data identifying the desired tasks in the payload portion.

Some of nodes 140/170/190 may be implemented as corresponding data stores. Each data store represents a non-volatile (persistent) storage facilitating storage and retrieval of data by applications executing in the other systems/nodes of computing infrastructures 130/160/180. Each data store may be implemented as a corresponding database server using relational database technologies and accordingly provide storage and retrieval of data using structured queries such as SQL (Structured Query Language). Alternatively, each data store may be implemented as a corresponding file server providing storage and retrieval of data in the form of files organized as one or more directories, as is well known in the relevant arts.

Some of the nodes 140/170/190 may be implemented as corresponding server systems. Each server system represents a server, such as a web/application server, executing enterprise applications (examples of user applications) capable of performing tasks requested by users using user systems 110. A server system receives a user request from a user system and performs the tasks requested in the user request. A server system may use data stored internally (for example, in a non-volatile storage/hard disk within the server system), external data (e.g., maintained in a data store/node) and/or data received from external sources (e.g., from the user) in performing the requested tasks. The server system then sends the result of performance of the tasks to the requesting user system (one of 110) as a corresponding response to the user request. The results may be accompanied by specific user interfaces (e.g., web pages) for displaying the results to the requesting user.

In one embodiment, each customer/tenant is provided with a corresponding virtual computing infrastructure (referred to as a "tenant cloud") provisioned on the nodes of computing infrastructures 130, 160 and 180. Thus, tenant cloud administrators may manage the provisioned resources of his/her cloud using one of user systems 110. Also, cloud infrastructure administrators may manage infrastructure resources using one of user systems 110. A tenant cloud is often provisioned to span multiple cloud infrastructures, as described below with examples.

3. Hosting Tenant Clouds in Cloud Infrastructures

In one embodiment, virtual machines (VMs) form the basis for deployment of various user/enterprise applications in the nodes of computing infrastructures 130/160/180. As is well known, a virtual machine may be viewed as a container in which other execution entities are executed. A node/server system can typically host multiple virtual machines, and the virtual machines provide a view of a complete machine (computer system) to the user applications executing in the virtual machine. Although the description provided herein is with respect to VM resources, aspects of the present disclosure may be implemented with other types of resources (such as containers, disks, network devices, databases, etc.) in tenant clouds, as will be apparent to a skilled practitioner.

Figure 2:
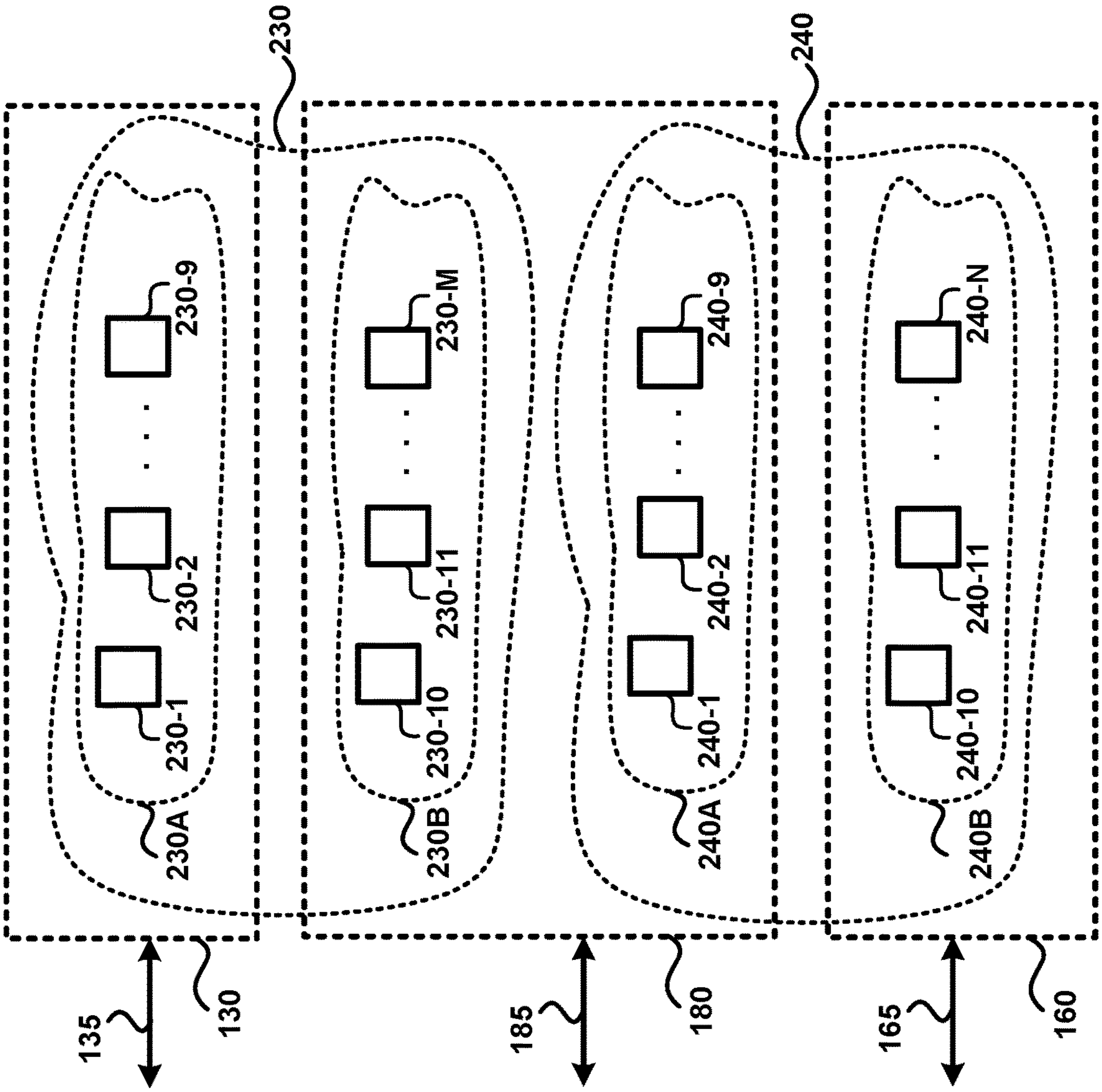
FIG. 2 illustrates the manner in which tenant clouds are hosted in computing infrastructures in one embodiment.

FIG. 2 illustrates the manner in which tenant clouds are hosted in cloud infrastructures in one embodiment. Specifically, the Figure illustrates the manner in which tenant clouds 230 and 240 are deployed in the nodes of cloud infrastructures 130/160/180 using VMs. Only a sample set of tenant clouds is shown in FIG. 2 for illustration, though many environments often host a large number (100+) tenant clouds across multiple cloud infrastructures.

Tenant cloud 230 is shown containing VMs 230-1 through 230-M (M representing any natural number) that may be provisioned on nodes 140 of on-prem system 130 and nodes 190 of cloud infrastructure 180. As is well known, a cloud containing a mixture of VMs provisioned in an on-prem system and VMs provisioned in a cloud infrastructure are referred to as "hybrid" cloud. Hybrid clouds are distinguished from other clouds that operate based on VMs provisioned on one or more cloud infrastructures. Tenant cloud 230 is accordingly a hybrid cloud provisioned across the nodes of computing infrastructures 130 and 180. Specifically, groups 230A and 230B respectively represents the set of VMs provisioned in on-prem system 130 and cloud infrastructure 180.

Similarly, tenant cloud 240 is another tenant cloud containing VMs 240-1 through 240-N (N representing any natural number) that may be provisioned on nodes 190 of cloud infrastructure 180 and nodes 170 of cloud infrastructure 160. Specifically, groups 240A and 240B respectively represents the set of VMs provisioned in cloud infrastructure 180 and cloud infrastructure 160. For illustration, it is assumed that each tenant cloud (230 and 240) is owned by a corresponding customer/tenant.

A tenant of a cloud (e.g., 230) may wish to perform various tasks on corresponding resources. Examples of such tasks include, but are not limited to, powering down/up a VM, upgrading the software on VMs, taking backup of data, restoring data, disaster recovery, VM network configuration, storage volume attachment/detachment, etc.

It may be appreciated that each cloud infrastructure may have a corresponding convention of characterizing the configuration information (including identity) of resources provisioned in that cloud infrastructure. Also, the volume of such disparate/diverse 'metadata' (data that characterizes the configuration of the resources) grows with the number of resources (which may be of the order of thousands of VMs in a tenant cloud, for example).

Thus, one of the challenges in performing the tasks (noted above) in tenant clouds spanning multiple cloud infrastructures is to be able to easily and accurately control execution of (i.e., orchestrate) the tasks on any desired resources. Selecting appropriate resources for execution of tasks requires knowledge of metadata supported by the corresponding cloud infrastructure.

Orchestrator 150, provided according to several aspects of the present disclosure, facilitates orchestration of tasks in tenant clouds spanning multiple cloud infrastructures. In an embodiment, orchestrator 150 is provided as a centralized component (as depicted in FIG. 1), external to cloud infrastructures 130/160/180. In an alternative embodiment, a respective orchestrator 150 instance may be provided on a corresponding node in each tenant cloud. In yet another alternative embodiment, orchestrator 150 may be provided as a service (software-as-a-service), deployed as part of each tenant cloud.

The manner in which orchestration of tasks may be provided in tenant clouds is described below with examples.

Figure 3:
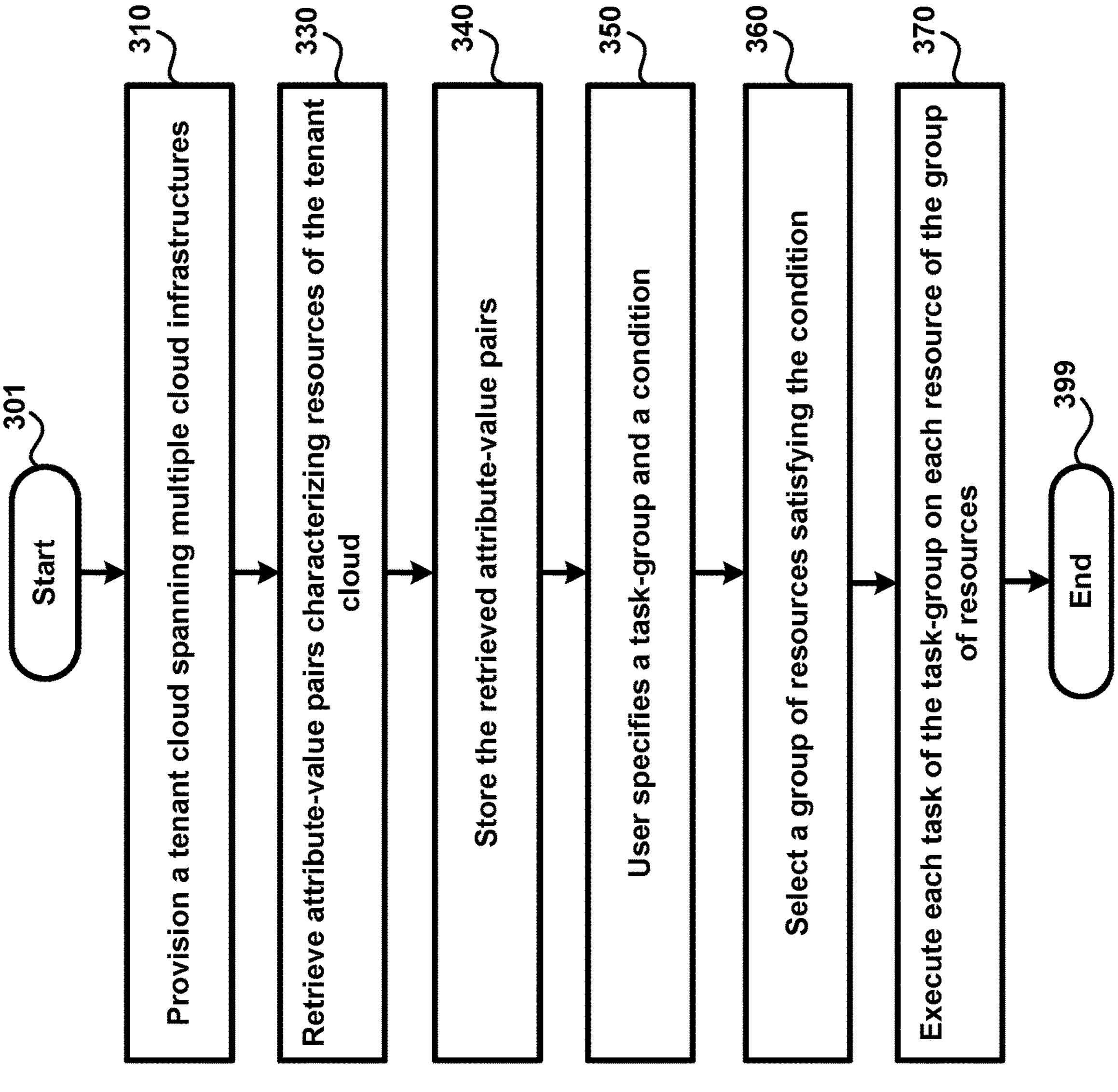
FIG. 3 is a flow chart illustrating the manner in which orchestration of tasks in tenant clouds spanning multiple cloud infrastructures is performed according to an aspect of the present disclosure.

4. Orchestration of Tasks in Tenant Clouds Spanning Multiple Cloud Infrastructures FIG. 3 is a flow chart illustrating the manner in which tasks are orchestrated in tenant clouds spanning multiple cloud infrastructures according to an aspect of the present disclosure. The flowchart is described with respect to the systems of FIGS. 1 and 2, in particular orchestrator 150, merely for illustration. However, many of the features can be implemented in other environments also without departing from the scope and spirit of several aspects of the present invention, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present invention. The flow chart begins in step 301, in which control immediately passes to step 310.

In step 310, orchestrator 150 provisions a tenant cloud spanning multiple cloud infrastructures. Such provisioning may entail the tenant specifying (via one of user systems 110) the desired number of resources (e.g., VMs) to be part of each cloud infrastructure. In addition, the tenant may also specify the configuration parameters of each resource, such as compute capacity/storage/OS type, etc. In one embodiment, orchestrator 150 provisions (creates) a tenant cloud for the tenant is by allocating the desired number of resources hosted on nodes 140/170/190 in cloud infrastructures 130/

160/180. The tenant may thereafter deploy desired user applications for execution in his/her tenant cloud.

In step 330, orchestrator 150 retrieves attribute-value pairs (metadata) characterizing resources of the tenant cloud. According to an aspect, orchestrator 150 retrieves the attribute-value pairs of each resource in each cloud infrastructure over which the tenant cloud spans before the user specifies a condition in step 350. The attribute-value pairs may be retrieved periodically to ensure the data is reasonably current for any given time instance.

Thus, for tenant cloud 230 (of FIG. 2), orchestrator 150 retrieves attribute-value pairs characterizing VMs 230-1 through 230-9 of cloud infrastructure 130 and VMs 230-10 through 230-M of cloud infrastructure 180. The retrieval may entail sending requests to each resource, and receiving the attribute-value pairs as responses to the request. Retrievals may be performed at a sequence of pre-determined time points. Alternatively, some or all of the resources in each cloud infrastructure may be configured to push/send the attribute-value pairs to orchestrator 150 at pre-determined time points.

In step 340, orchestrator 150 stores the retrieved attribute-value pairs. In one embodiment, the attribute-value pairs are stored in a local data store. It may be appreciated that the stored attribute-value pairs may be used subsequently to enable users to easily and accurately specify groups of resources, as described in detail below.

In step 350, a user specifies a task-group and a condition using one of user systems 110. A task-group is defined to contain a set of tasks that needs to be performed on a group of resources. A condition is a constraint specified by the user that forms the basis of selection of the group of resources. The user may specify the condition independently of specifying the task-group. Thus, the user may specify the condition at a first time instance, and specify the task-group at a second time instance (subsequent to the first time instance).

In one embodiment, a condition contains a condition-key specifying an identifier of an attribute of a resource, and a condition-value indicating the desired value of the attribute. For example, a user may specify a condition to indicate VMs of a particular operating system (OS) type (e.g., Linux). Here, OS type is the condition-key, and the specified OS type (Linux) is the condition-value. A condition is deemed to be satisfied if the attribute-identifier of an attribute-value pair matches the condition-key and the value of the attribute-value pair matches the condition-value. It may be appreciated that a condition may contain one or more sub-conditions. In such cases, a condition is deemed to be satisfied only when the requisite sub-conditions present in the condition are met. For example, a user may specify a condition to indicate VMs of a particular OS type (sub-condition 1) and VMs whose name starts with 'abc' (sub-condition 2).

A task-group may contain one or more tasks that the user wishes to execute on each of the resources in the group of resources. The group of resources on which a task-group is desired to be invoked may be referred to as an endpoint. Accordingly, each task-group is associated with a corresponding endpoint. Each task in the task-group may be specific to the type of resource in the endpoint. In other words, the user may specify a task-group to contain tasks that are supported to be performed on each resource of the endpoint. The user may specify the task-group to be invoked periodically (at pre-determined time(s) of day/week, etc.). Alternatively, or in addition, the task-group may be invoked by the user on-demand at desired time instances.

In step 360, orchestrator 150 selects a group of resources satisfying the condition. Orchestrator 150 examines the stored attribute-value pairs of resources of the tenant cloud, and selects only those resources that satisfy the condition specified by the user. Orchestrator 150 may perform the selection either upon the receipt of the condition or at the time of each invocation of the task-group.

In step 370, orchestrator 150 executes each task of the task-group on each resource of the group of resources. In one embodiment, orchestrator 150 may execute the tasks concurrently on sub-groups of resources contained in the endpoint. It may be appreciated that certain tasks of the task-group may be defined to update a value of an attribute-value pair. In such cases, execution of the task also entails updating the corresponding attribute-value pair in the data store. Subsequent tasks in the task-group operate on the updated value. Also, subsequent selections of groups of resources operate on the updated value. The flowchart ends in step 399.

Thus, the flow-chart of FIG. 3 provides a convenient mechanism by which users may execute a group of tasks on each of desired group of resources.

According to another aspect described below, for the user to conveniently specify the condition in step 350, the user may first specify a tentative condition, and orchestrator 150 immediately displays matching resources based on the locally stored attribute-value pairs. The user may accordingly refine the tentative condition (while examining the corresponding matching resources upon each refinement) until a final condition is specified as the (final) condition of step 350.

The manner in which orchestrator 150 operates in accordance with the steps of FIG. 3 to provide several aspects of the present disclosure is described below with examples.

5. Example Implementation

Figure 4:
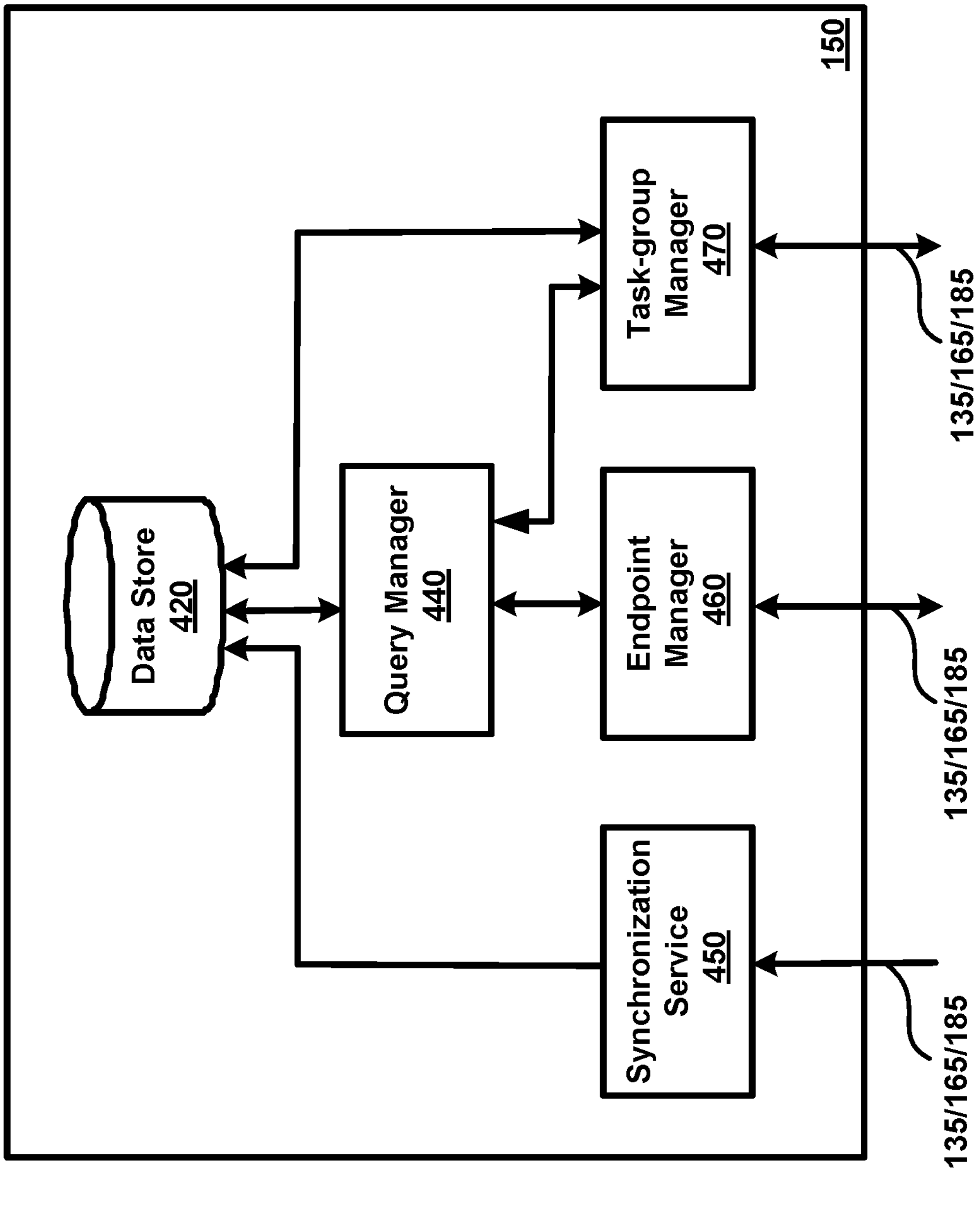
FIG. 4 illustrates the implementation details of an orchestrator system in one embodiment.

FIG. 4 illustrates the implementation details of an orchestrator in one embodiment. Orchestrator 150 is shown containing data store 420, query manager 440, synchronization service 450, endpoint manager 460 and task-group manager 470. Each of the blocks is described in detail below.

Data store 420 represents a non-volatile (persistent) storage facilitating storage and retrieval of data by other components of orchestrator 150, and can be implemented external to orchestrator 150 also. Data store 420 may be implemented as a database server using relational database technologies and accordingly provide storage and retrieval of data using structured queries such as SQL (Structured Query Language). Alternatively or in addition, data store 420 may be implemented as a file server providing storage and retrieval of data in the form of files organized as one or more directories, as is well-known in the relevant arts. Data store 420 stores data associated with tenant clouds such as the corresponding cloud infrastructures over which each tenant cloud spans, tenant account information (e.g., account id, credentials, etc.) associated with each cloud infrastructure, metadata specifying configuration of resources in tenant clouds, endpoints and task-groups data. In one embodiment, metadata characterizing resources is stored as corresponding attribute-value pairs in data store 420.

Query manager 440 provides an interface to query metadata from data store 420. As noted above, each cloud infrastructure may have a respective manner of specifying metadata. For example, an attribute specifying a certain characteristic of a resource may be identified as 'attribute-1' in cloud infrastructure 130, while the same characteristic may be identified as 'attribute-2' in cloud infrastructure 160. However, when a user specifies a condition for selection of resources, the user may specify the characteristic using 'attribute-common'. Query manager 440 operates to convert to/from cloud infrastructure-specific attributes, as will be described below in detail. In an embodiment, query manager 440 employs FIQL (Feed Item Query Language) parser in order to efficiently retrieve metadata satisfying specified conditions.

Synchronization service 450 operates to retrieve metadata of resources in various cloud infrastructures over which each tenant cloud spans. Synchronization service 450 may retrieve the metadata at a sequence of pre-determined time points, as configured by the user. In one embodiment, synchronization service 450 retrieves metadata every 20 minutes. Synchronization service 450 may send requests to each resource, and receive the metadata as responses to the request over corresponding paths 135/165/185. Alternatively, each resource in each cloud infrastructure may be configured to push/send the metadata to synchronization service 450 at pre-determined time points. Synchronization service 450 stores the retrieved information in data store 420. As the attribute-value pairs are stored as received from respective cloud infrastructures, the attribute-identifiers in data store 420 are according to the convention in the respective cloud infrastructure.

Endpoint manager 460 facilitates storage and retrieval of data associated with endpoints in tenant clouds. Endpoint manager 460 receives user requests (via user systems 110) associated with endpoints (such as creating/modifying/deleting endpoints), sends the requests to query manager 440, receives respective responses from query manager 440 and forwards the responses to users.

The group of resources in an endpoint may be determined statically or selected dynamically, as described below.

Static determination—Endpoint manager 460 may determine the group of resources to be included in an endpoint based on a condition received from user at the time of defining the endpoint. Endpoint manager 460 employs query manager to determine the group of resources satisfying the condition, and stores the list of resources along with the corresponding endpoint. Thereafter, each invocation of task-group(s) associated with the endpoint operates on the fixed (static) group of resources.

Dynamic selection—Endpoint manager 460 stores the condition received from the user at the time of defining the endpoint. The group of resources is selected at the time of each invocation of task-group associated with the endpoint and thus the group of resources varies at different instances of invocation.

Task-group manager 470 facilitates storage and retrieval of data associated with task-groups in tenant clouds. Task-group manager 470 receives user requests (via user systems 110) associated with task-groups (such as creating/modifying/deleting), performs the desired operations on task-groups stored in data store 420, and forwards the responses to users. During each invocation of a task-group, task-group manager 470 retrieves the set of tasks in the task-group and the corresponding endpoint information associated with the task-group from data store 420.

In cases where the group of resources is static (as noted above), task-group manager 470 retrieves the group of resources associated with the endpoint directly from data store 420, and executes each task of the task-group on each resource of the endpoint. In the case of dynamic selection, task-group manager 470 retrieves the condition stored with the endpoint, and selects the group of resources for each invocation. In such cases, task-group manager 470 uses query manager 440 to map the attributes to select the group of resources satisfying the condition. Task-group manager 470 then executes each task of the task-group on each selected resource.

The description is continued to illustrate some of the above noted features with respect to sample metadata.

6. Metadata of Resources

FIGS. 5A-5C depict portions of metadata of cloud resources (VMs) deployed in a tenant cloud in one embodiment. In one embodiment, metadata in stored in data store 420 in the form of attribute-value pairs. While FIG. 5A depicts attribute-value pairs according to one convention, similar relationship can be specified using other data formats (such as extensible markup language (XML), etc.) and/or using other data structures (such as database tables/lists, trees, etc.), as will be apparent to one skilled in the relevant arts by reading the disclosure herein.

Metadata 500 depicts a portion of attribute-value pairs characterizing a VM (e.g., 230-2) provisioned in cloud infrastructure 130 as part of tenant cloud 230. As noted below, the portion depicts attribute-identifier and the corresponding value of each attribute-value pair. Specifically, metadata 500 is shown containing, among other configuration data:

"_id" (502) that uniquely identifies the VM in tenant cloud 230,

"name" (504) that specifies the name of VM 230-2,

"categories" (506) depict multiple values (list) associated for the same key, "power_state" (505) indicating whether VM 230-2 is powered ON or OFF at the time of retrieval of metadata, "OSType" (507) that specifies the OS type of VM 230-2, "nic_list" (508) that specifies the list of network interface cards (NICs) available on VM 230-2, and "memory_size_bytes" (509) that specifies the memory (RAM) allocated to VM 230-2.

Thus, VM 230-2 is shown to be configured with name "vm-220124-084537" (504) and OS type "Linux" (507).

FIG. 5B depicts a portion of metadata 510 characterizing a VM (e.g., 230-11) provisioned in cloud infrastructure 180 as part of tenant cloud 230. Specifically, metadata 510 is shown containing, among other configuration data, "_id" (512), "memory_size_bytes" (513), "power_state" (514), "name" (516), and "tags" (518).

It may be appreciated that data characterizing custom configuration information of a VM is stored using attribute-identifier "categories" (506 in FIG. 5A) for VM 230-2 (provisioned in cloud infrastructure 130), while the same characteristic data is stored using attribute-identifier "tags" (518 in FIG. 5B) for VM 230-11 (provisioned in cloud infrastructure 18)0.

FIG. 5C depicts a portion of metadata 520 specifying configuration data of a VM (e.g., 240-11) provisioned in cloud infrastructure 160 as part of tenant cloud 240. Specifically, metadata 520 is shown containing, among other configuration data, "_id" (522), "memory_size_bytes" (523), "power_state" (524), "name" (526), "tags" (527) and "instance type"' (528) that specifies the OS type of VM 240-11.

It may be appreciated that data characterizing type of OS of a VM is stored using attribute-identifier "OSType" (507 in FIG. 5A) for VM 230-2 provisioned in cloud infrastructure 130, while the same characteristic data is stored using attribute-identifier "instance type" (528 in FIG. 5C) for VM 240-11 provisioned in cloud infrastructure 160.

The manner in which orchestrator 150 facilitates users to specify endpoints according to aspects of the present disclosure is described next.

7. Specifying an Endpoint

FIGS. 6A-6E together depict (sample) user interfaces used for specifying endpoints in one embodiment. Display area 600/650 (of FIGS. 6A-6E) represents a portion of a user interface displayed on a display unit (not shown) associated with one of user systems 110. In one embodiment, display area 600/650 corresponds to a web page rendered by a browser executing on a user system. The web pages may be provided by orchestrator 150 in response to a user (such as a tenant cloud administrator, etc.) sending appropriate requests (for example, by specifying corresponding Uniform Resource Locator (URL) in the address bar) using the browser. Although the description provided herein is with respect to user interfaces provided as corresponding web pages for specifying endpoints, aspects of the present disclosure may be implemented with other types of user interfaces such as command line interfaces, as will be apparent to a skilled practitioner.

Figure 6A:
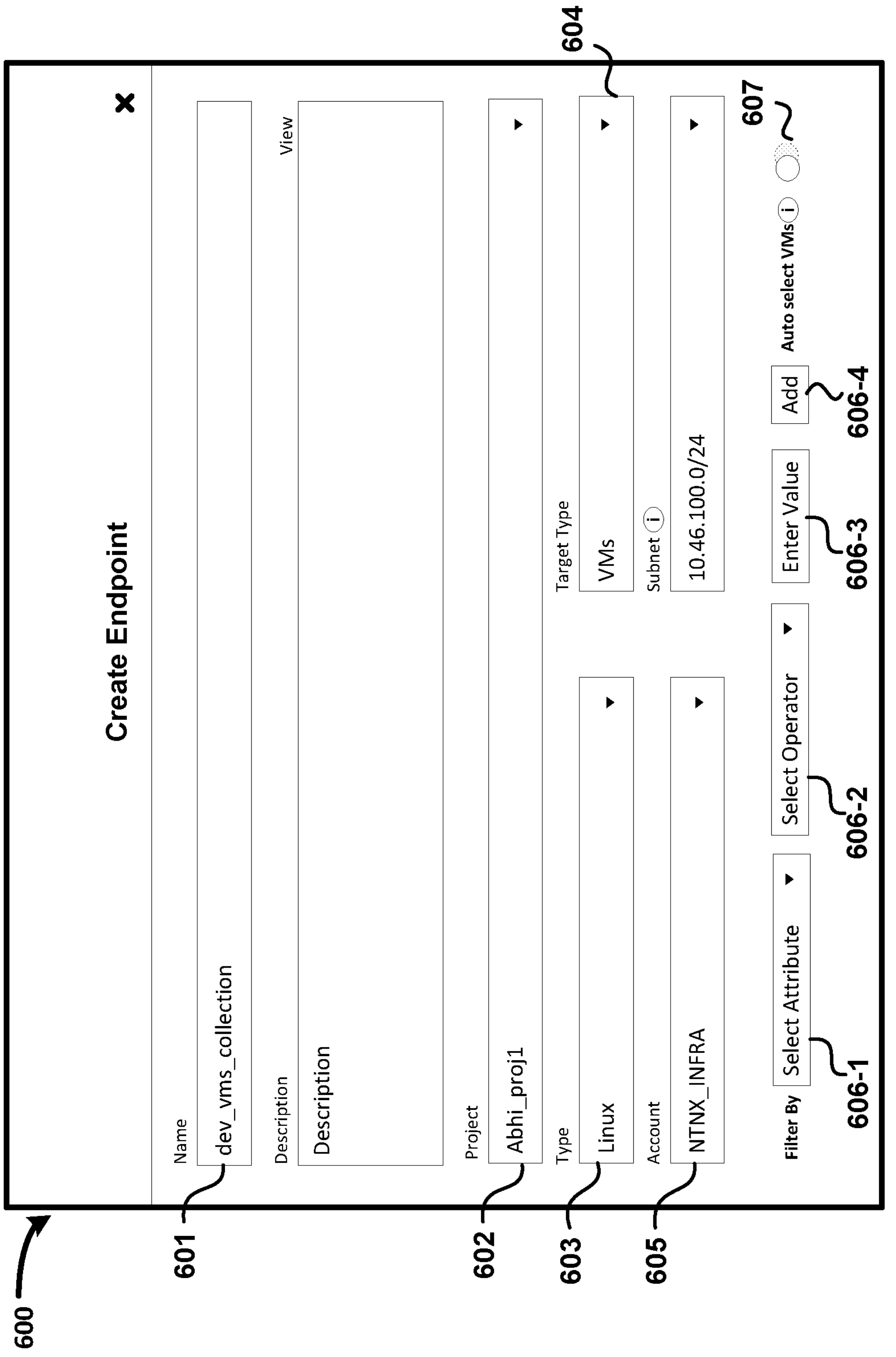
FIGS. 6A-6E depict user interfaces used for specifying endpoints in one embodiment.
Figure 6B:
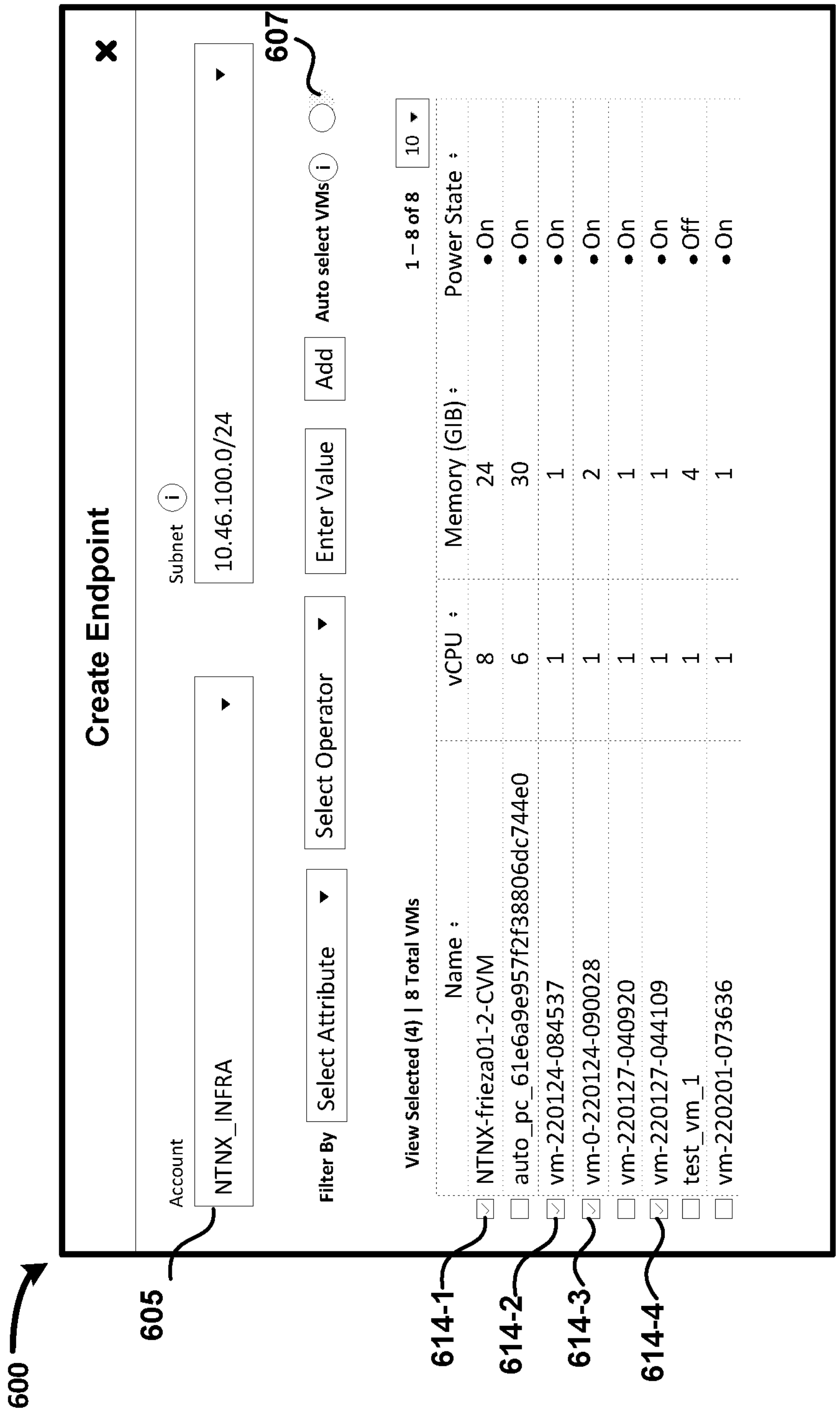
Figure 6C:
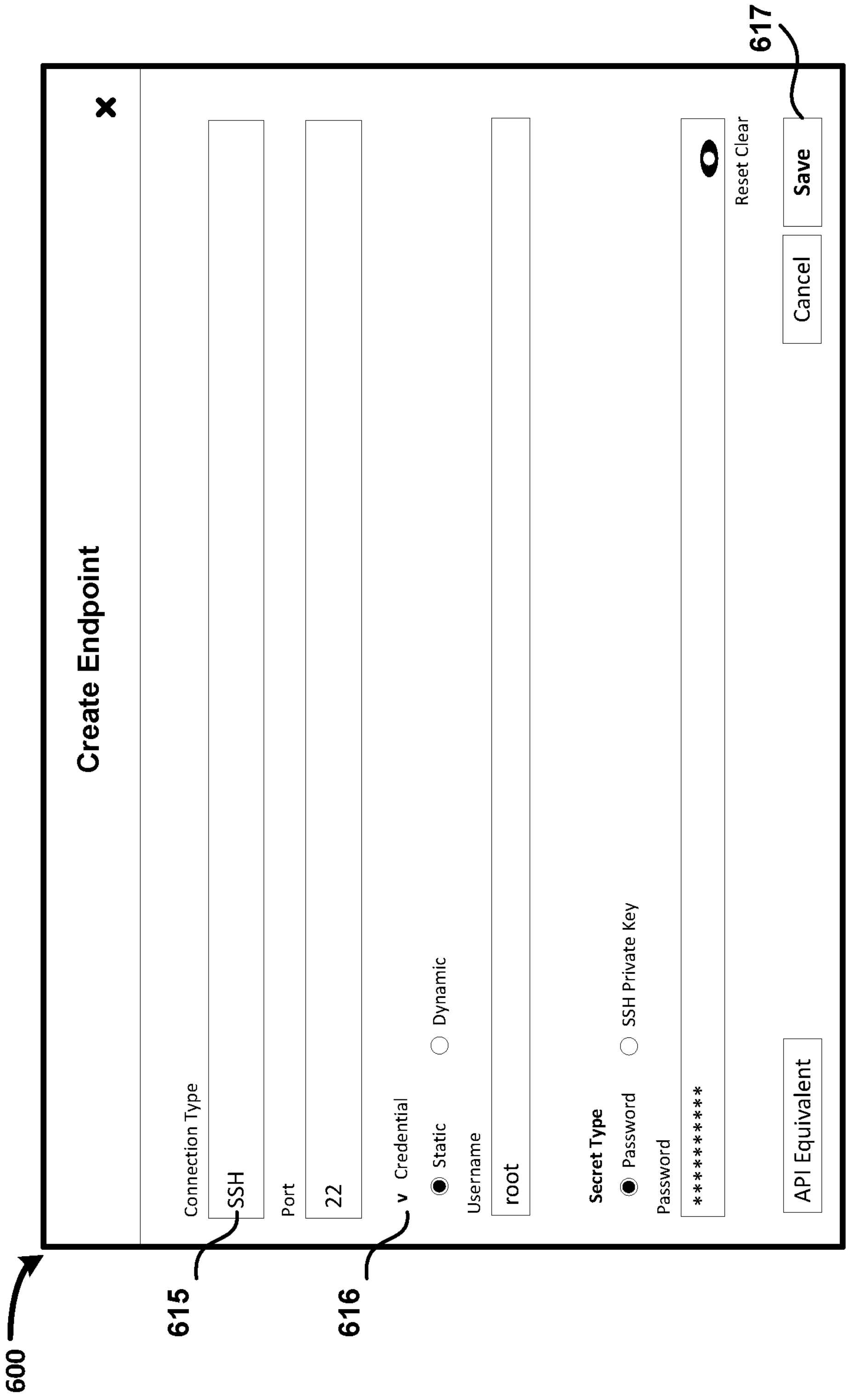

Each of FIGS. 6A-6C depicts a portion of display area 600 used for specifying endpoints. Referring to FIG. 6A, display area 600 depicts some of the parameters that can be specified by a user for creating an endpoint. Only some of the fields as relevant to the understanding of the disclosure are depicted in display area 600 for the sake of conciseness. Display area 600 may contain fewer/more fields, depending on the particular user interface implementation, as will be apparent to a skilled practitioner. Further, it is assumed that pre-requisite configurations have already been completed by tenant cloud administrators prior to creating endpoints. For example, it is assumed that corresponding cloud infrastructure accounts have been set up for each cloud infrastructure over which the tenant cloud spans, and projects have been created to map such accounts and define user roles (such as administrator/consumer/operator, etc.) to access and use orchestrator 150. As is well known in the relevant arts, a cloud infrastructure account encapsulates the credentials needed to access resources in the corresponding cloud infrastructure.

The user may specify a name (601) and description for the endpoint, and select one of the pre-configured projects (such as 602) in which the endpoint will be created. The user may select 'Type' (such as 603) of the endpoint, indicating the communication protocol to be used for accessing resources in the endpoint. In an embodiment, the endpoint type can be one of 'Linux', 'Windows' or 'HTTP'. For type 'HTTP', a user may need to additionally specify a base URL (not shown) to connect to the resource.

The user may select 'Target Type' (such as 604) for the endpoint. In an embodiment, the endpoint target type can be one of 'IP Addresses' or 'VMs'. The endpoint may thus be viewed as a collection of IP addresses or a collection of VMs. For target type 'IP Addresses', the user may additionally specify the list of IP addresses and connection parameters (such as connection protocol (e.g., HTTP/HTTPs) and port number). The user may specify IP addresses across multiple cloud infrastructures (over which the tenant cloud spans) for the endpoint. For target type 'VMs', the user may specify the account (such as 605), indicating the cloud infrastructure in which the VMs are provisioned. 'Account' dropdown (605) shown in area 600 lists all the accounts corresponding to cloud infrastructures over which the tenant cloud spans. Thus, for users of tenant cloud 230, 'Account' dropdown (605) lists accounts associated with cloud infrastructures 130 and 180, while for users of tenant cloud 240, 'Account' dropdown (605) lists accounts associated with cloud infrastructures 180 and 160. The user is assumed to have selected account associated with cloud infrastructure 130 in this illustration.

Toggle button 607 specifies whether the current end-point specification filters are to be evaluated statically (607 turned OFF) or dynamically (607 turned ON). In one embodiment, toggle button 607 is OFF by default (as shown in FIG. 6A). Irrespective of the state (ON/OFF) of toggle button 607, the user is enabled to specify attributes on which resources may be filtered using elements 606-1, 606-2, 606-3 and 606-4. However, in case of dynamic filters, the filters are evaluated dynamically at the time of invocation for each invocation. In the other hand, in case of static filters, the list is determined manually at the time of definition of the endpoint (in accordance with FIG. 6A).

Dropdown 606-1 lists the attributes (such as 'Name', 'Power State', 'RAM', etc.) that the user can specify in a sub-condition. Dropdown 606-2 lists the operators (such as 'NOT IN', 'EQUALS', 'STARTS WITH', 'LESS THAN', etc.) that the user can specify in the sub-condition. The user can specify a desired value for the attribute selected (in dropdown 606-1) in text area 606-3. Clicking 'Add' button 606-4 enables the user to specify additional sub-conditions. Thus, a condition specified by the user may contain one or more sub-conditions.

When toggle button 607 is OFF and the user selects desired values (601, 602, 603, 604, 605, etc.), and specifies respective filter attributes (using elements 606-1, 606-2, 606-3, 606-4) endpoint manager 460 retrieves the list of resources (from data store 420) satisfying the tentative condition specified by the user. Specifically, endpoint manager 460 sends the tentative condition specified by the user to query manager 440. Query manager 440 maps the attributes received from endpoint manager 460 to cloud infrastructure-specific attributes stored in data store 420.

Thus, in the illustration, query manager 440 receives the following tentative condition from endpoint manager 460: "Type=Linux" and "Target Type=VMs" and "Account=NTNX_INFRA". Query manager 440 examines 'account' attribute and determines, in a known way, that the corresponding cloud infrastructure is cloud infrastructure 130. Query manager 440 maps attribute 'type' to 'OSType' (specific to cloud infrastructure 130), and retrieves VMs (target type) provisioned in cloud infrastructure 130 that are part of tenant cloud 230, and having OS type 'Linux'. Endpoint manager 460 receives the results from query manager 440 and displays the list of VMs in display area 600 of FIG. 6B. It may be observed that VM 230-2 (the metadata of which is depicted in FIG. 5A) satisfies the tentative condition specified by the user, and hence is retrieved from data store 420 and displayed as part of the results (614-2).

It may be appreciated that the user may examine the displayed results, and thereafter further refine the tentative condition, e.g., select type as 'Windows' in dropdown 603 of FIG. 6A. Endpoint manager 460 immediately updates display area 600 of FIG. 6B to display resources satisfying the refined condition (i.e., VMs having OS type 'Windows'). The user may repeat the process until he/she specifies a final condition to accurately select the desired resources. In the illustration, the user is assumed to have specified the condition "Type=Linux" and "Target Type=VMs" and "Account=NTNX_INFRA" as the final condition. The user then selects desired VMs to be included in the endpoint. Specifically, the user is shown as having selected VMs 614-1, 614-2, 614-3 and 614-4 (indicated by the tick in the corresponding check-box) to be included in the endpoint.

FIG. 6C depicts various other parameters that the user may specify while creating the endpoint. Specifically, the user may then specify connection details (615) and credential information (616) for the endpoint. When the user clicks 'Save' button (617), endpoint manager 460 stores the endpoint named 'dev-vms_collection' (601 in FIG. 6A) along with the 4 selected VMs in data store 420. The group of VMs in the endpoint is thus static (4 VMs) (given static filter specified at 607). For each invocation of task-group(s) that are associated with the endpoint, the corresponding tasks in the task-group will be executed only on these 4 VMs.

Figure 6D:
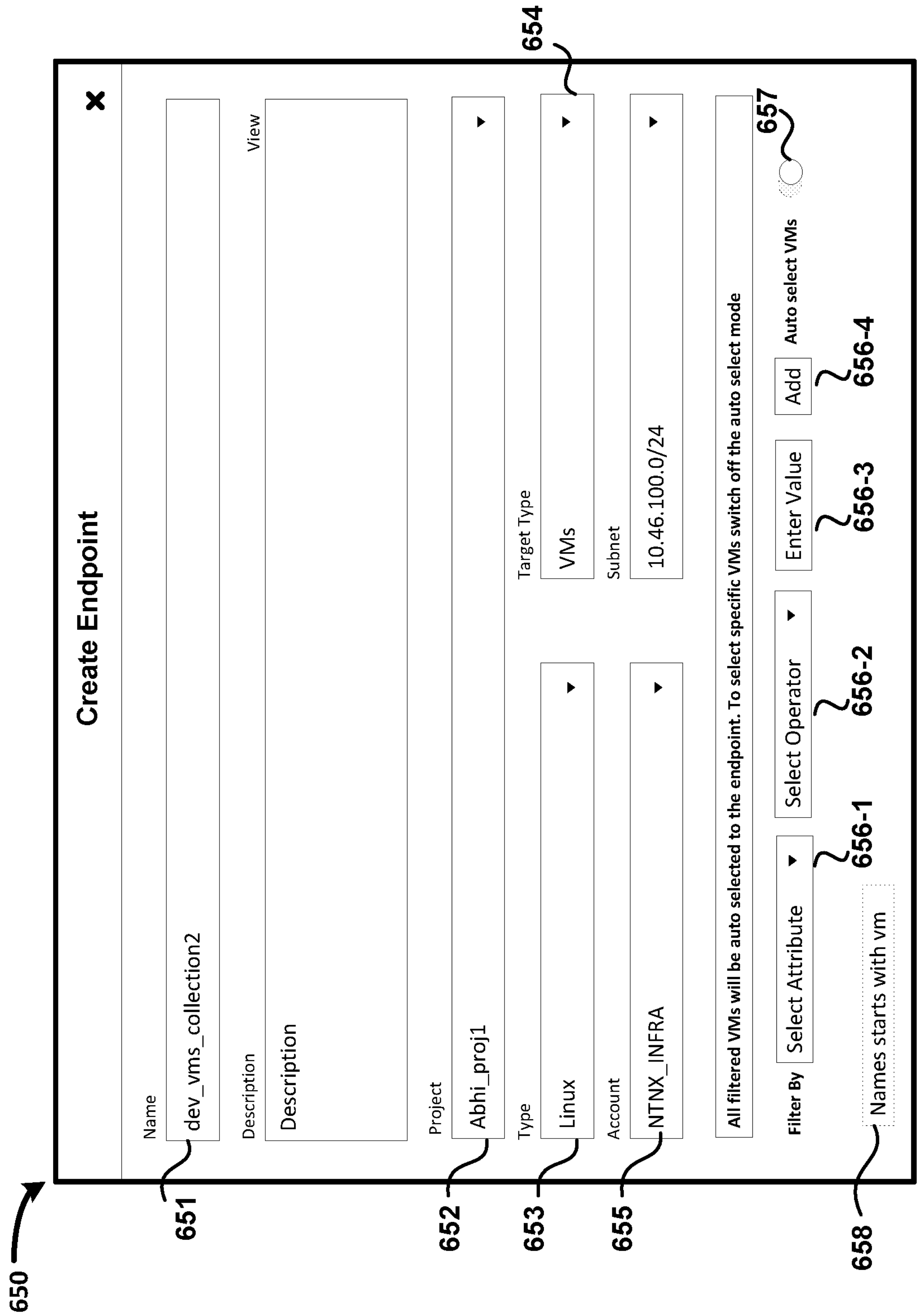

FIG. 6D depicts dynamic selection of resources for an endpoint in one embodiment. Display area 650 illustrates the manner in which a user can specify an endpoint with dynamic selection of resources. Fields 651, 652, 653, 654, 655, 657, 656-1, 656-2, 656-3 and 656-4 depicted in display area 650 respectively correspond to fields 601, 602, 603, 604, 605, 607, 606-1, 606-2, 606-3 and 606-4 depicted in FIG. 6A, and their description is not repeated here in the interest of brevity.

Figure 6E:
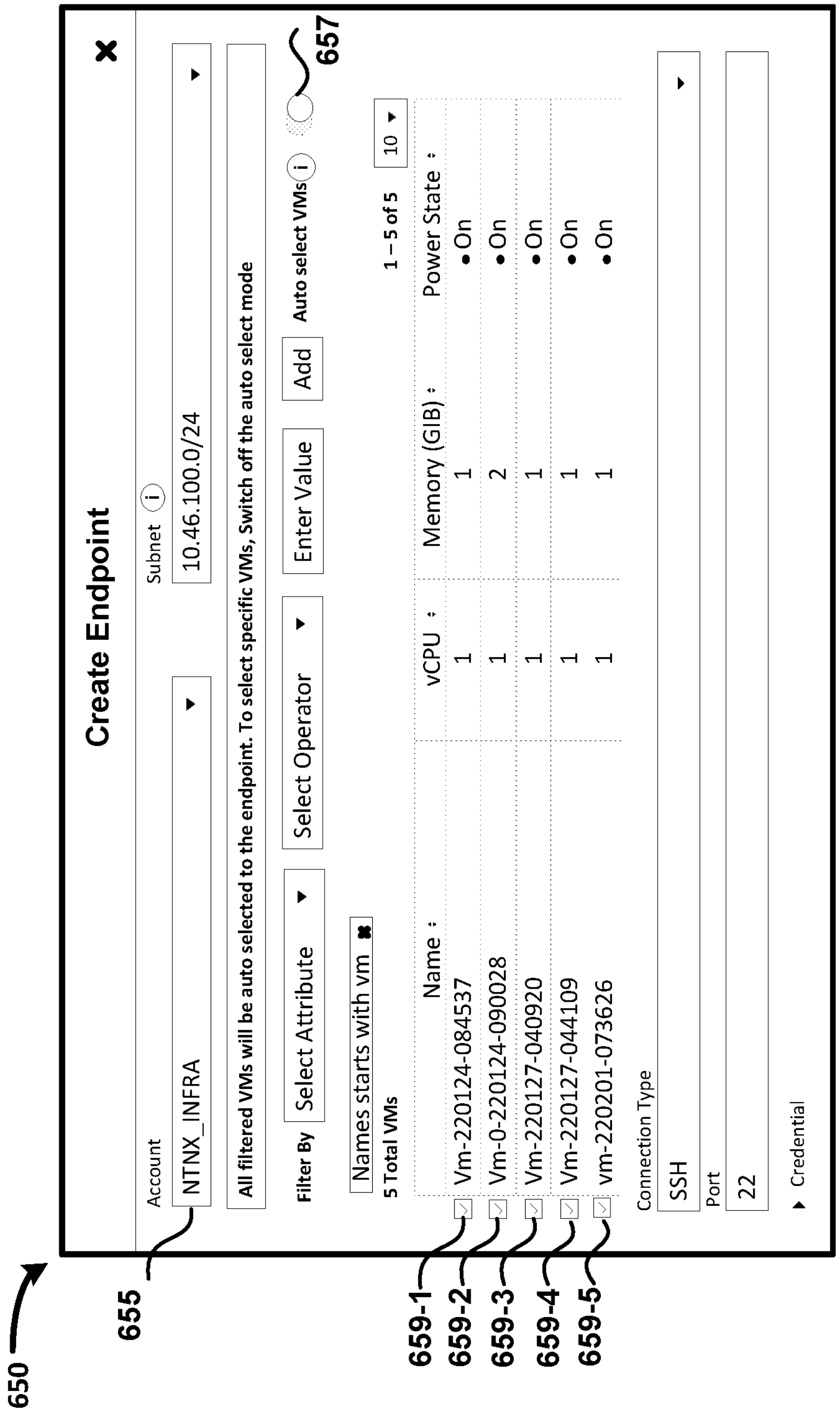

As shown in FIG. 6D, the user has turned ON toggle button 657 and has specified the tentative condition 'Name starts with vm' (displayed in text area 658). Upon receiving the tentative condition, endpoint manager 460 immediately retrieves the set of resources satisfying the tentative condition and displays the list of such resources. Referring to FIG. 6E, a total of 5 VMs (satisfying the tentative condition) are displayed in display area 650. It may be observed that endpoint manager 460 has auto-selected (indicated by a tick in the corresponding check-box) all the VMs (659-1, 659-2, 659-3, 659-4 and 659-5). As noted above, with respect to FIGS. 6A-6B, the user may examine the results displayed, and thereafter further refine the tentative condition, e.g., additionally specify condition 'Power State equals ON'. Endpoint manager 460 immediately updates display area 650 of FIG. 6E to display resources satisfying the refined condition (i.e., VMs whose name starts with vm and which are in powered-ON state). The user may repeat the process until he/she specifies a final condition to accurately select the desired resources. In the illustration, the user is assumed to have specified the condition 'Name starts with vm' as the final condition.

When toggle button 607 is ON and the user specifies the final condition, endpoint manager 460 stores the condition specified by the user along with the endpoint information in data store 420. However, in case of button 607 being OFF, endpoint manager 460 stores the list of resources along with the endpoint information in data store 420.

The endpoints thus specified by the user are thereafter available to be associated with task-groups, as described next.

8. Specifying a Task-Group

FIGS. 7A-7G together depict (sample) user interfaces used for specifying task-groups in one embodiment. Respective display areas of FIGS. 7A-7G represent a portion of a user interface displayed on a display unit (not shown) associated with one of user systems 110. In one embodiment, the display areas correspond to a web page rendered by a browser executing on a user system. The web pages may be provided by orchestrator 150 in response to a user (such as a tenant cloud administrator, etc.) sending appropriate requests (for example, by specifying corresponding Uniform Resource Locator (URL) in the address bar) using the browser. Although the description provided herein is with respect to user interfaces provided as corresponding web pages for specifying task-groups, aspects of the present disclosure may be implemented with other types of user interfaces such as command line interfaces, as will be apparent to a skilled practitioner.

Figure 7A:
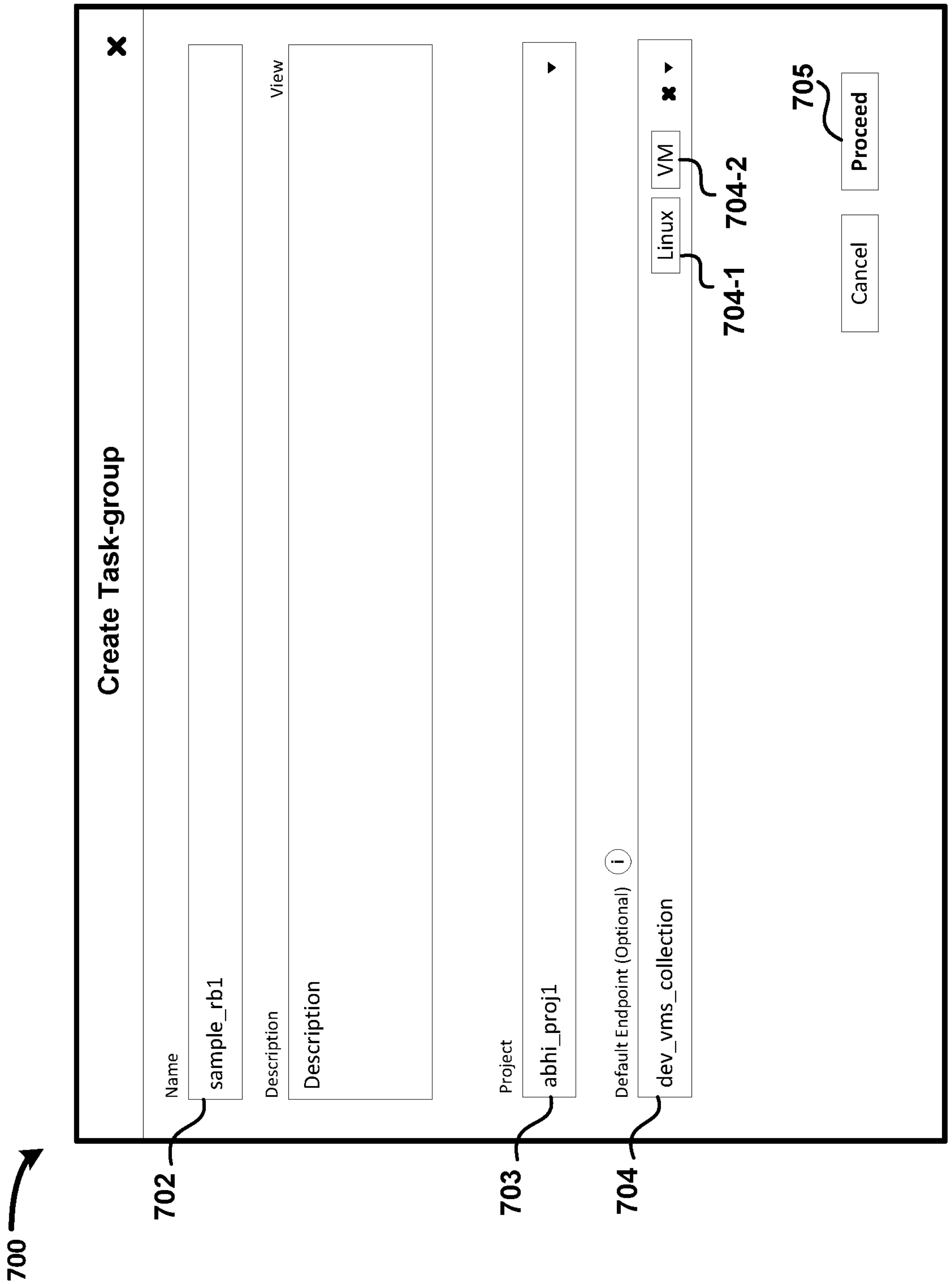
FIGS. 7A-7G depict user interfaces used for specifying task-groups in one embodiment.

Referring to FIG. 7A, display area 700 depicts some of parameters that that can be specified by a user for creating a task-group. Only some of the fields as relevant to the understanding of the disclosure are depicted in display area 700 for the sake of conciseness. Display area 700 may contain fewer/more fields, depending on the particular user interface implementation, as will be apparent to a skilled practitioner. Further, it is assumed that pre-requisite configurations have already been completed by tenant cloud administrators prior to creating task-groups.

The user may specify a name (702) and description for the task-group, and select one of the pre-configured projects (such as 703) in which the task-group will be created. The user may select a default endpoint for the task-group from dropdown 704. In FIG. 7A, the user is shown as having selected endpoint named 'dev-vms_collection' (created using user interfaces depicted in FIGS. 6A-6C). Optionally, the user may specify endpoint for tasks in the task-group. The type ('Linux') and target type ('VM') of endpoint 'dev-vms_collection' are displayed in areas 704-1 and 704-2.

When the user clicks 'Proceed' button (705), task-group manager 470 creates a task-group named 'sample_rb1' (702) in data store 420. Task-group manager 470 also associates endpoint (here, 'dev-vms_collection') with the task-group. The user can then specify tasks and various other configuration parameters for task-group 'sample_rb1' as described below with respect to FIGS. 7B-7F.

Figure 7B:
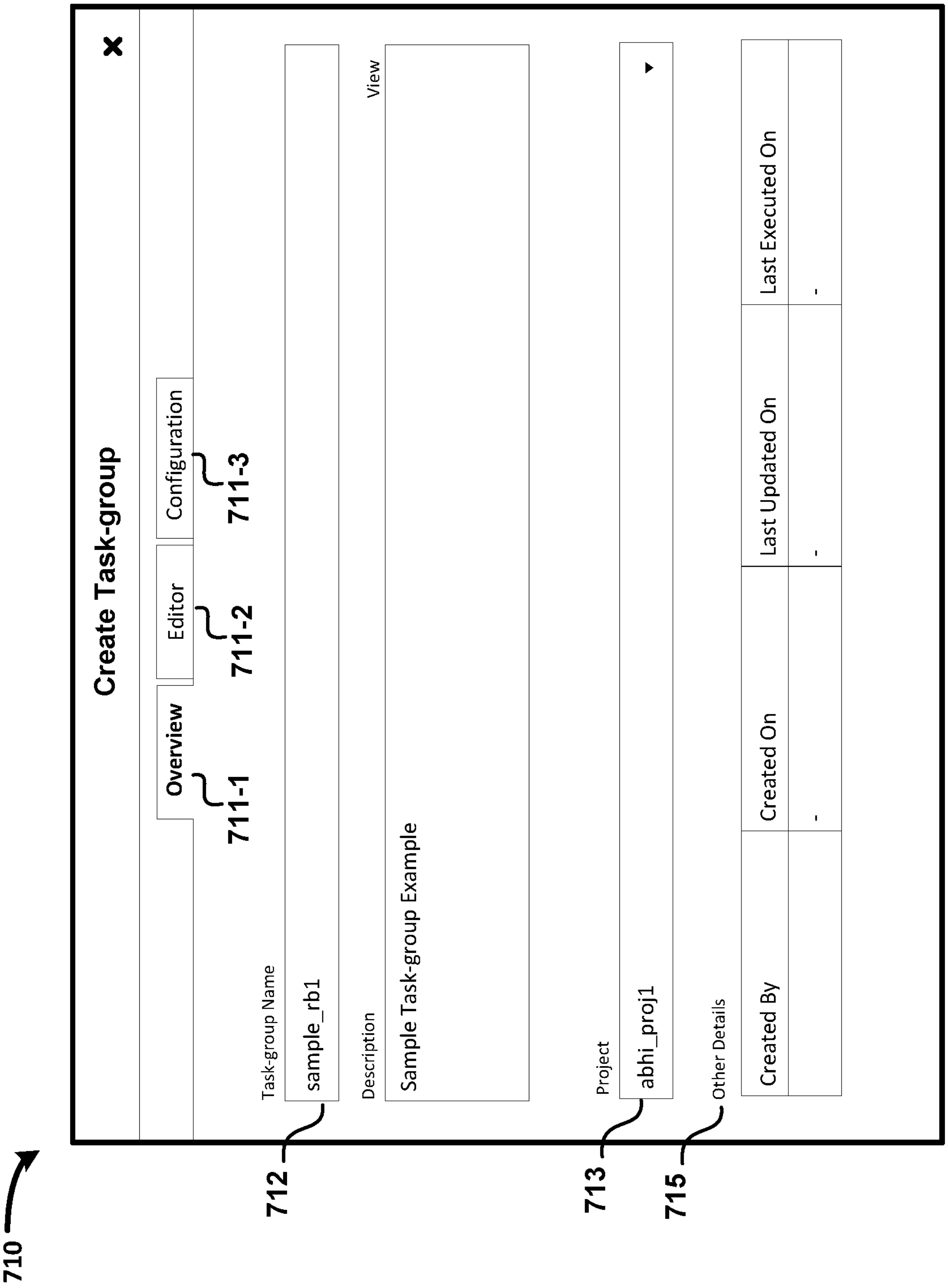

FIG. 7B depicts a sample user interface used for viewing/editing a task-group in one embodiment. Display area 710 is shown containing tabs 'Overview' (711-1), 'Editor' (711-2) and 'Configuration' (711-3). Details in tab 'Overview' are shown in FIG. 7B. Fields 712 and 713 depicted in display area 710 respectively correspond to fields 702 and 703 depicted in FIG. 7A, and their description is not repeated here in the interest of brevity. Portion 715 of display area 715 displays details of the task-group.

Figure 7C:
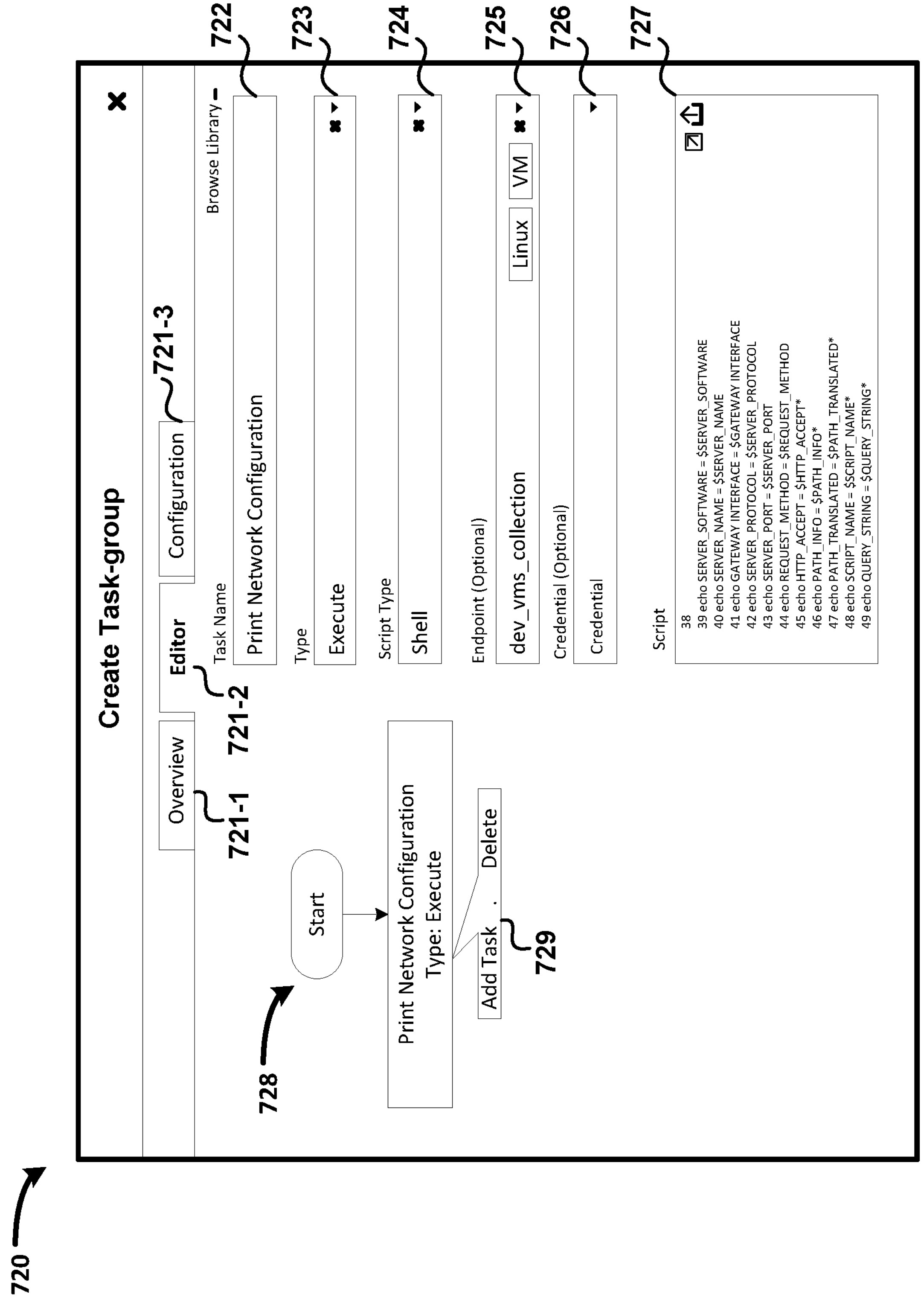

FIG. 7B is shown displaying details of task-group 'sample_rb1' created using user interface of FIG. 7A. The user may select 'Editor' tab (711-2) to specify tasks in task-group 'sample_rb1'. When user selects 'Editor' tab, display area 720 depicted in FIG. 7C is displayed to the user.

Display area 720 (of FIG. 7C)) is shown containing text area task name (722), dropdown task type (723), dropdown script type (724), dropdown endpoint (725), dropdown credential (726), text area script (727) and task graph 728. Each of the fields is described below.

Task name (722) facilitates the user to specify the name of the task. Dropdown task type (723) allows the user to specify the type of task. In one embodiment, task type is one of 'Execute', 'Set Variable', 'Delay', 'HTTP', 'Decision', 'VM Power Off', 'VM Power On' or 'VM Restart'. Thus, the user may select VM-related tasks (such as 'VM Restart') for endpoints of target type 'VM'.

Dropdown script type (724) lets the user specify the type of script associated with the task. In one embodiment, script type is one of 'Shell', 'PowerShell' or 'eScript'. 'eScript' may be implemented as Python script with a selected sub-set of supported Python modules. As an example, the user may select script type 'eScript' for endpoints having target type 'VMs'.

Dropdown endpoint (725) allows the user to specify an endpoint on which the task may execute. If no endpoint is specified at the task-level, the task is executed on each of the resources of the endpoint specified at the task-group level.

However, if respective endpoints are specified at both the task level (e.g., labeled first task) and the task-group level, then the task level endpoint takes priority. That is, each task for which a corresponding endpoint is not specified at the task level, is executed on each resource of the endpoint associated with the task-group, while the first task is executed on each resource of the endpoint specified at the task level.

For example, assume that a task-group containing 3 tasks (t1, t2 and t3 in that sequential order of execution) has been specified with an endpoint (ep1) associated at the task-group level, and additionally, endpoint (ep2) has been specified for task t2 explicitly. Tasks t1 and t3 do not have corresponding endpoints specified at task level. Then, upon invoking the task-group, task t1 is executed on each resource of ep1, task t2 is executed only on the each resource of ep2 (instead of those on ep1) and task t3 is executed on each resource of ep1, in that order. Thus a convention is provided to conveniently specify a task-group with a desired flow, and yet control endpoints with respect to specific tasks in the flow, as may be desirable in corresponding situations.

In one embodiment, the list of endpoints populated in dropdown 725 is based on the task type and the script type specified by the user. For example, if the user has specified task type 'VM Power On', then only resources of target type 'WM' (and not of type 'IP Address') are populated in dropdown 725. Similarly, if the user has specified script type 'Shell', then only Linux VMs are populated in dropdown 725.

It may be appreciated that enabling the user to specify an endpoint at a task level facilitates the user to conveniently create task-groups containing tasks that need to be executed on groups of resources spanning multiple cloud infrastructures. In other words, a user of tenant cloud 230 may wish to restarts all Linux VMs in his/her tenant cloud. The user may thus conveniently specify a task-group with two tasks—a first task specifying 'Restart VMs' with endpoint (specifying Linux VMs) in cloud infrastructure 130 and a second task specifying 'Restart VMs' with endpoint (specifying Linux VMs) in cloud infrastructure 160. Upon execution of the example task-group, Linux VMs contained in both cloud infrastructures 130 and 160 are restarted.

Dropdown credential (726) allows the user to select credential for executing the task. Text area script (727) allows the user to enter (type) or upload a script. The script specifies the sequence of operations to be performed as part of executing the task. Task graph 728 provides a visual representation of the sequence of execution of tasks as and when a task is added to the task-group. For example, if a task type of 'Decision' is added to the task-group, task graph 728 may display a branch each indicating the possible outcome (Yes/No) of the decision. Under each branch, the user may add the corresponding task based on the outcome. The user can add/delete tasks using field 729.

Referring to FIG. 7C, in the illustration, the user is shown as adding a task named 'Print Network Configuration' of type 'Execute' and having script type 'Shell'. The task is specified to be executed on endpoint 'dev_vms_collection', and a portion of the script specified by the user for the task is depicted in area 727. Task 'Print Network Configuration' is specified to retrieve the existing network configuration (as corresponding attribute-value pairs) of each resource. Specifically, network configuration parameters include IP address, subnet and gateway information, maximum transmission unit (MTU), list of TCP and UDP sockets, etc. It may be observed that task graph 728 displays the newly added task.

Figure 7D:
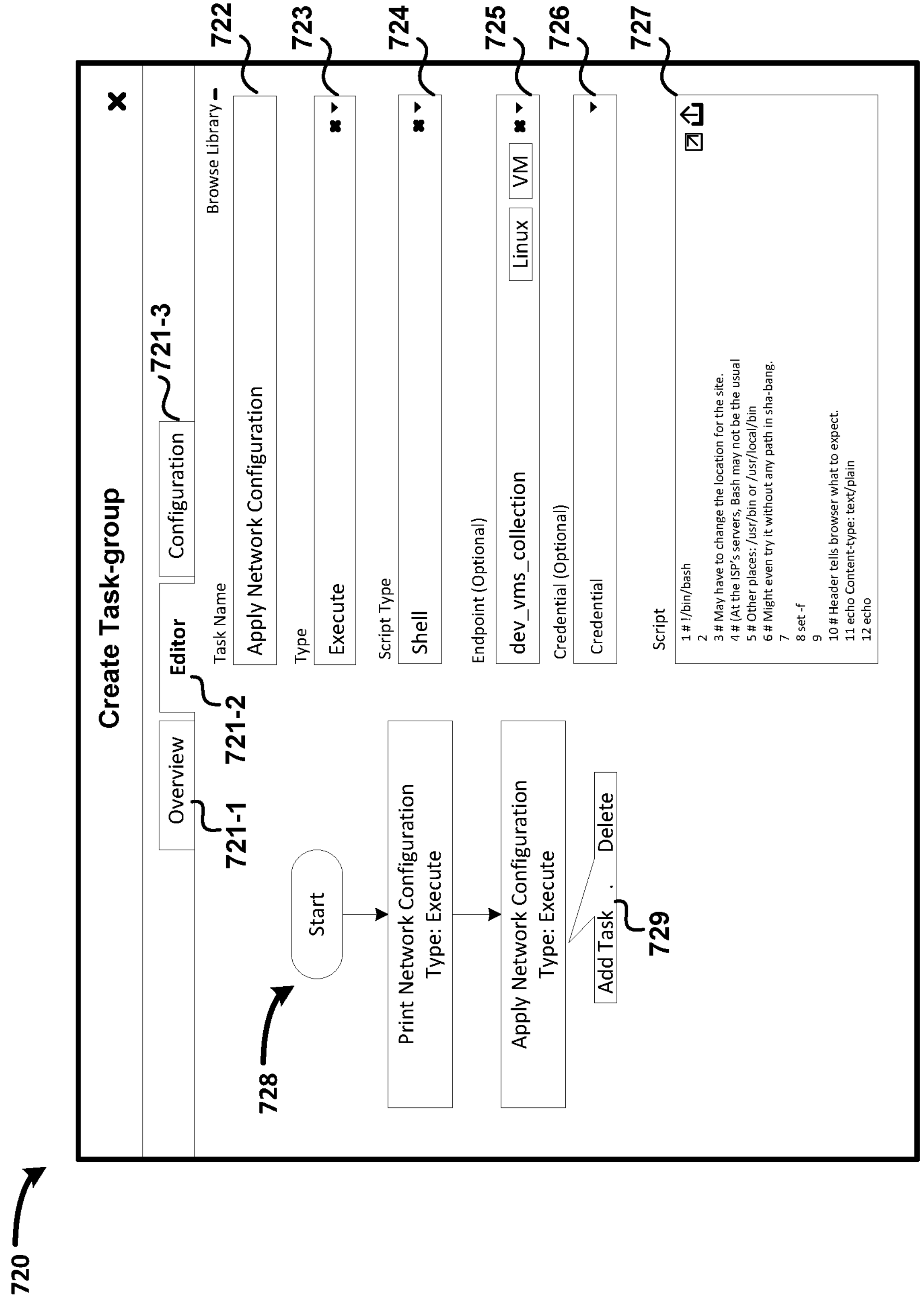

Referring to FIG. 7D, the user is shown as adding a task named 'Apply Network Configuration' of type 'Execute' and having script type 'Shell'. The task is specified to be executed on endpoint 'dev_vms_collection', and a portion of the script specified by the user for the task is depicted in area 727. Task 'Apply Network Configuration' is specified to update network configuration of each resource. Specifically, task 'Apply Network Configuration' updates network device name, sets MTU and queue length, toggles promiscuous code, adds one or more DNS services and updates DHCP (Dynamic Host Configuration Protocol) client configuration. It may be observed that task graph 728 displays tasks 'Print Network Configuration' and 'Apply Network Configuration'.

Figure 7E:
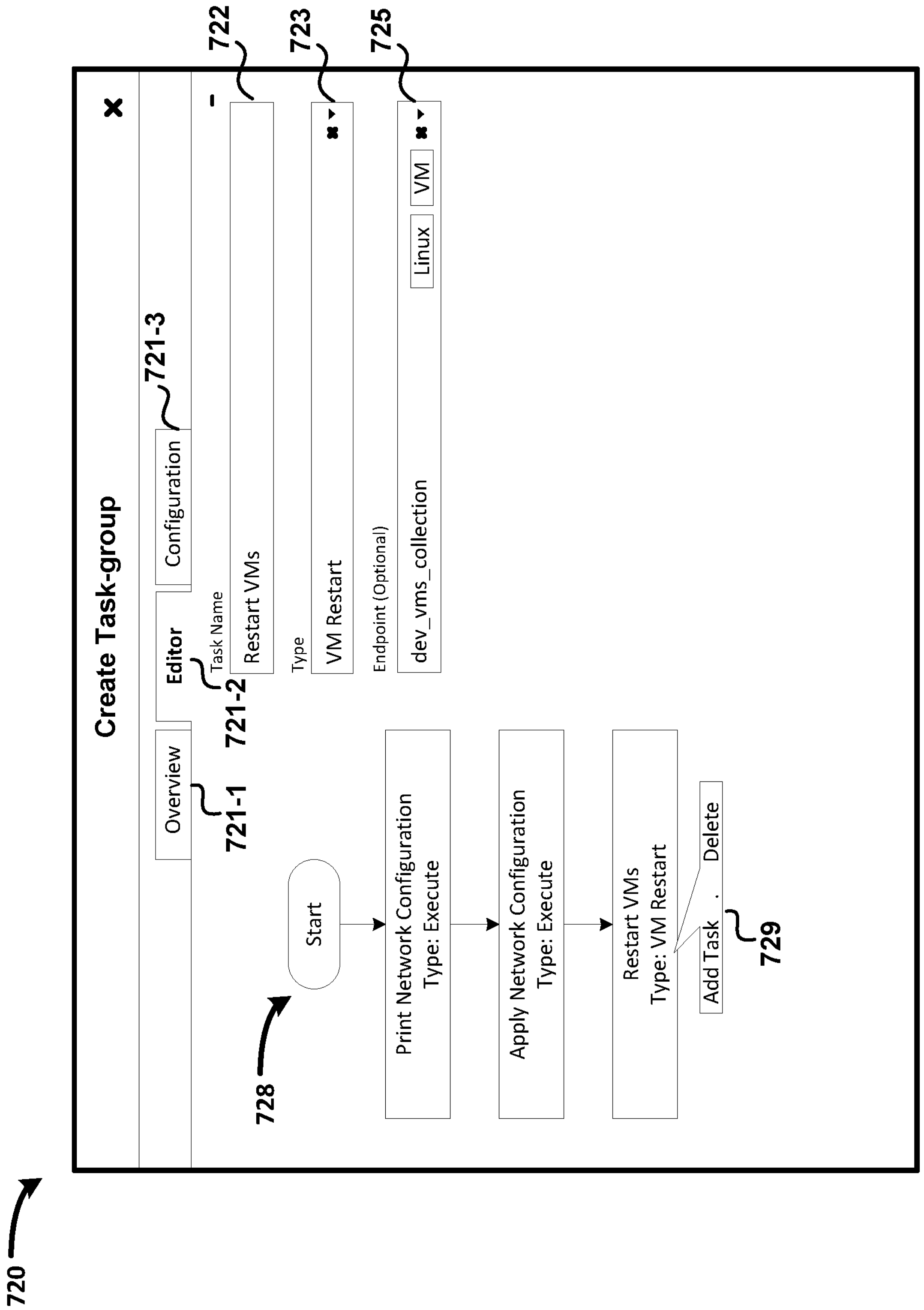

Referring to FIG. 7E, the user is shown as adding a task named 'Restart VMs' of type 'VM Restart' to be executed on endpoint 'dev_vms_collection'. In one embodiment, a default script is configured by tenant cloud administrators for this task type, and accordingly, the user is not given an option to specify any script for this task. Task 'Restart VMs' is specified to restart each VM in the specified endpoint. Task graph 728 is updated to display tasks 'Print Network Configuration', 'Apply Network Configuration' and 'Restart VMs'.

Figure 7F:
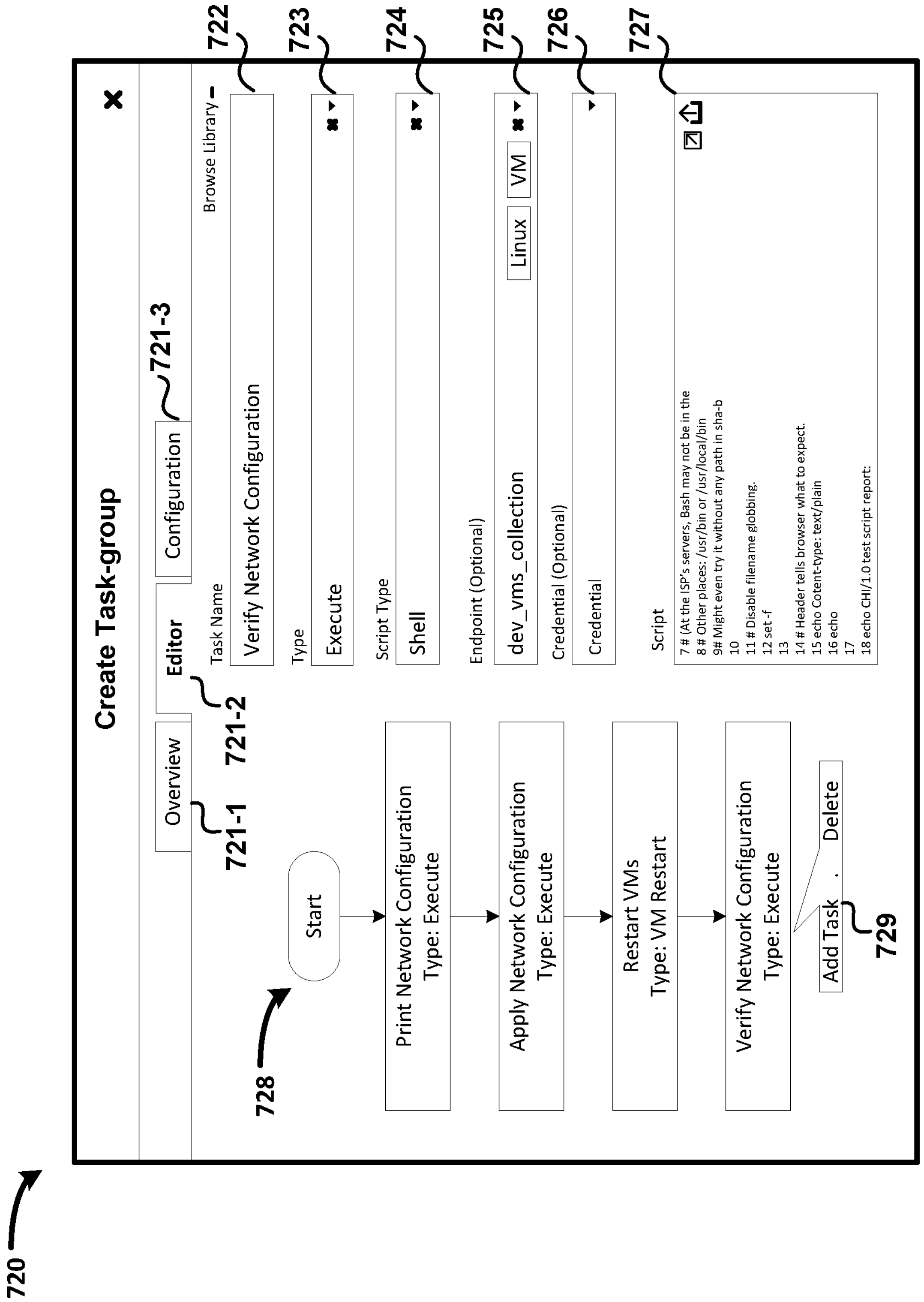

Referring to FIG. 7F, the user is shown as adding a task named 'Verify Network Configuration' of type 'Execute' and having script type 'Shell'. The task is specified to be executed on endpoint 'dev_vms_collection', and a portion of the script specified by the user for the task is depicted in area 727. Task 'Verify Network Configuration' is specified to verify network configuration of each resource. Specifically, task 'Verify Network Configuration' is specified to retrieve the network configuration values from each resource of the endpoint, and validate the retrieved values with the values specified in task 'Apply Network Configuration'. Task graph 728 is updated to display tasks 'Print Network Configuration', 'Apply Network Configuration', 'Restart VMs' and 'Verify Network Configuration'. In one embodiment, task graph is a directed acyclic (no loops) graph. After adding desired number of tasks, the user may select 'Configuration' tab. When user selects 'Editor' tab, display area 780 depicted in FIG. 7G is displayed to the user.

Figure 7G:
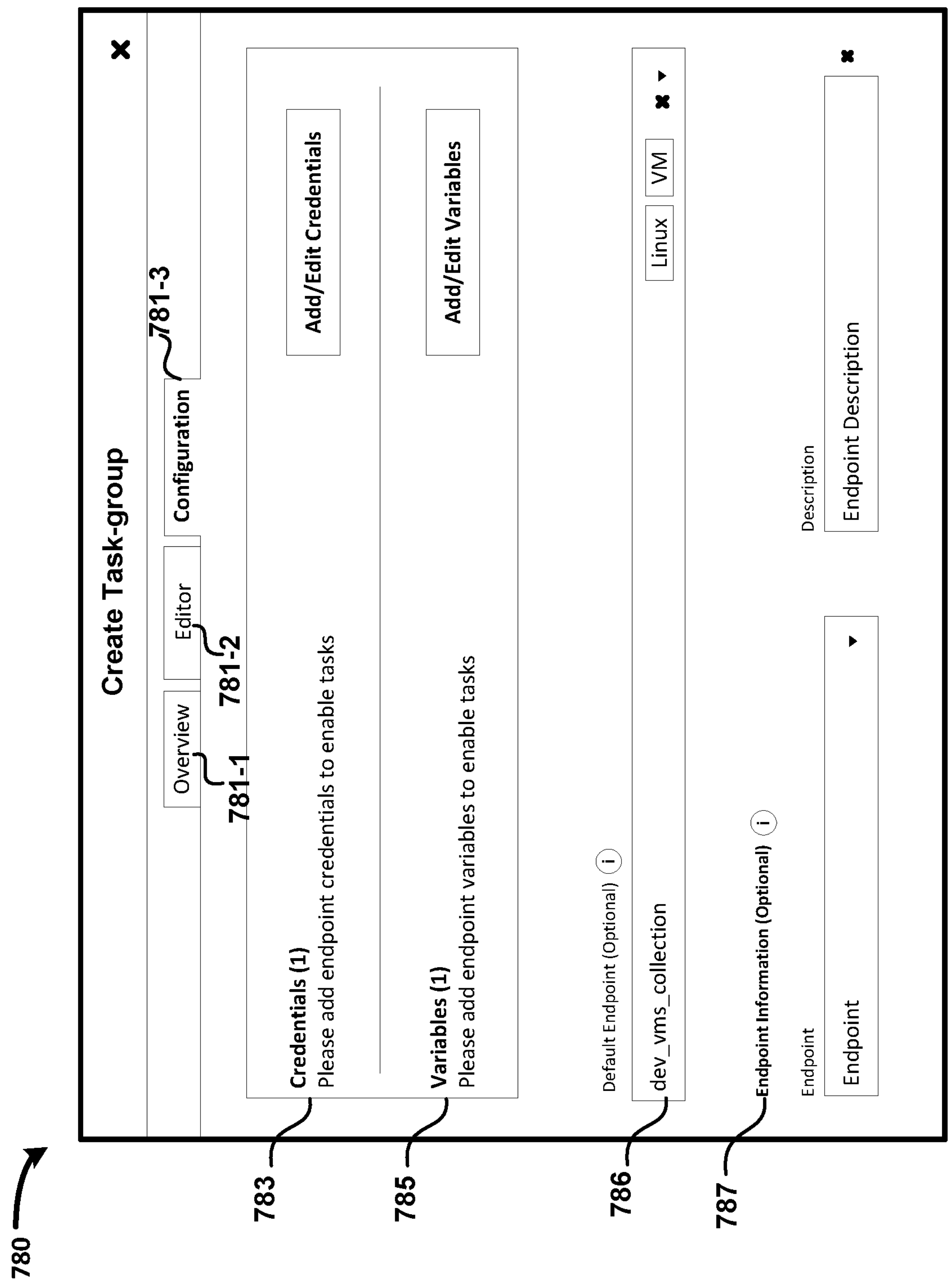

FIG. 7G depicts 'Configuration' tab of task-group user interface in one embodiment. The user may specify appropriate credentials in area 783 to enable tasks in the task-group. The user may additionally specify variables in area 785 to enable tasks in the task-group. Variables may be used by the user to specify values before each invocation of the task-group, and such values may be utilized during execution of tasks in the task-group for that invocation. Dropdown 786 enables the user to modify the endpoint for the task-group. Area 787 displays information (such as endpoint name and description) about the selected endpoint.

Task-group 'sample_rb1' thus is shown containing 4 tasks to be executed in a particular sequence as depicted in FIG. 7F. The manner in which task-group 'sample_rb1' is invoked is described next.

9. Invoking a Task-Group

A user may invoke a task-group on-demand via user interface (not shown). Alternatively, or in addition, a user may specify that the task-group be invoked periodically (at pre-determined time(s) of day/week, etc.). The description is continued to illustrate the manner in which tasks in task-group 'sample_rb1' are executed.

Upon invocation of task-group 'sample_rb1', task-group manager 470 retrieves task-group information from data store 420. Task-group manager 470 determines that task-group 'sample_rb1' is associated with endpoint 'dev_vms_collection'. Task-group manager 470 also determines that the group of resources in endpoint 'dev_vms_collection' is static, and consists of 4 VMs (namely 'NTNX-frieza01-2-CVM', 'vm-220124-084537', 'vm-0-220124-090028' and 'vm-220127-044109', as specified by user using user interface of FIG. 6B). Therefore, task-group manager 470 retrieves metadata of each of the 4 VMs from data store 420, and executes the set of tasks specified in task-group 'sample_rb1'.

Thus, for each VM, task-group manager 470 first executes task 'Print Network Configuration' to print network configuration parameters (noted above with respect to FIG. 7C) in the corresponding task output area (not shown) in user interface/log. Upon successful execution of the task, task-group manager 470 then executes task 'Apply Network Configuration' to update/set configuration parameter values as specified with respect to FIG. 7D. Task-group manager 470 then restarts the VM (executes task 'Restart VMs'), and finally executes task 'Verify Network Configuration' to verify network configuration of the VM.

As part of execution of task 'Restart VMs' on a VM, the IP address of the VM may change. Task-group manager 470 notes the new IP address of the VM and updates metadata of the VM in data store 420. Any subsequent selection of group of resources is accordingly based on the new IP address.

Upon failure of any task in the task-group, task-group manager 470 may retry execution of the task and/or exit the current invocation. Task-group manager 470 may also log the pass/fail details of each task.

According to an aspect, task-group manager 470 may execute tasks in a task-group concurrently on sub-groups of resources in the endpoint associated with the task-group. Thus, in the illustration, task-group manager 470 may execute the four tasks on sub-groups of 2 VMs each to reduce latency of each invocation.

It may be appreciated that since endpoint 'dev_vms_collection' contains static list of 4 VMs, each invocation of task-group 'sample_rb1' will execute the tasks on the 4 VMs only.

In an alternative scenario, task-group 'sample_rb1' may be associated with endpoint 'dev_vms_collection2' (endpoint specified by user in FIG. 6D) instead of 'dev_vms_collection'. In this scenario, upon invocation of task-group 'sample_rb1', task-group manager 470 determines that the group of resources is dynamic. Accordingly, task-group manager 470 first retrieves the condition ('Name starts with vm') associated with endpoint 'dev_vms_collection2'. Task-group manager 470 then uses query manager 440 to map the attributes specified in the condition (here 'Name') and selects VMs satisfying the condition. Query manager 440 employs the following FIQL query to retrieve the list of VMs: 'name==vm.*'.

Thus, the number of VMs may vary for each invocation of task-group 'sample_rb1'. For example, assuming that the list of VMs in cloud infrastructure 130 is as depicted in FIG. 6E at the time of creating endpoint 'dev_vms_collection2', the number of VMs whose name starts with 'vm' is 5 at the time of creating endpoint 'dev_vms_collection2'. Accordingly, also assuming that no VMs are added/deleted in cloud infrastructure 130 after the creation of endpoint 'dev_vms_collection2', task-group manager 470 executes tasks of task-group 'sample_rb1' on the 5 VMs.

It may be appreciated that orchestrator 150 (specifically, task-group manager 470) eliminates the need to retrieve metadata of resources from corresponding cloud infrastructures for dynamic selection of resources at the time of invocation of task-groups. Rather, orchestrator 150 uses pre-fetched metadata stored in data store 420 to select groups of resources, thus reducing latency in task-group invocations.

Thus, orchestrator 150, provided according to several aspects of the present disclosure, facilitates orchestration of tasks in tenant clouds spanning multiple cloud infrastructures.

It should be appreciated that the features described above can be implemented in various embodiments as a desired combination of one or more of hardware, software, and firmware. The description is continued with respect to an embodiment in which various features are operative when the software instructions described above are executed.

10. Digital Processing System

Figure 8:
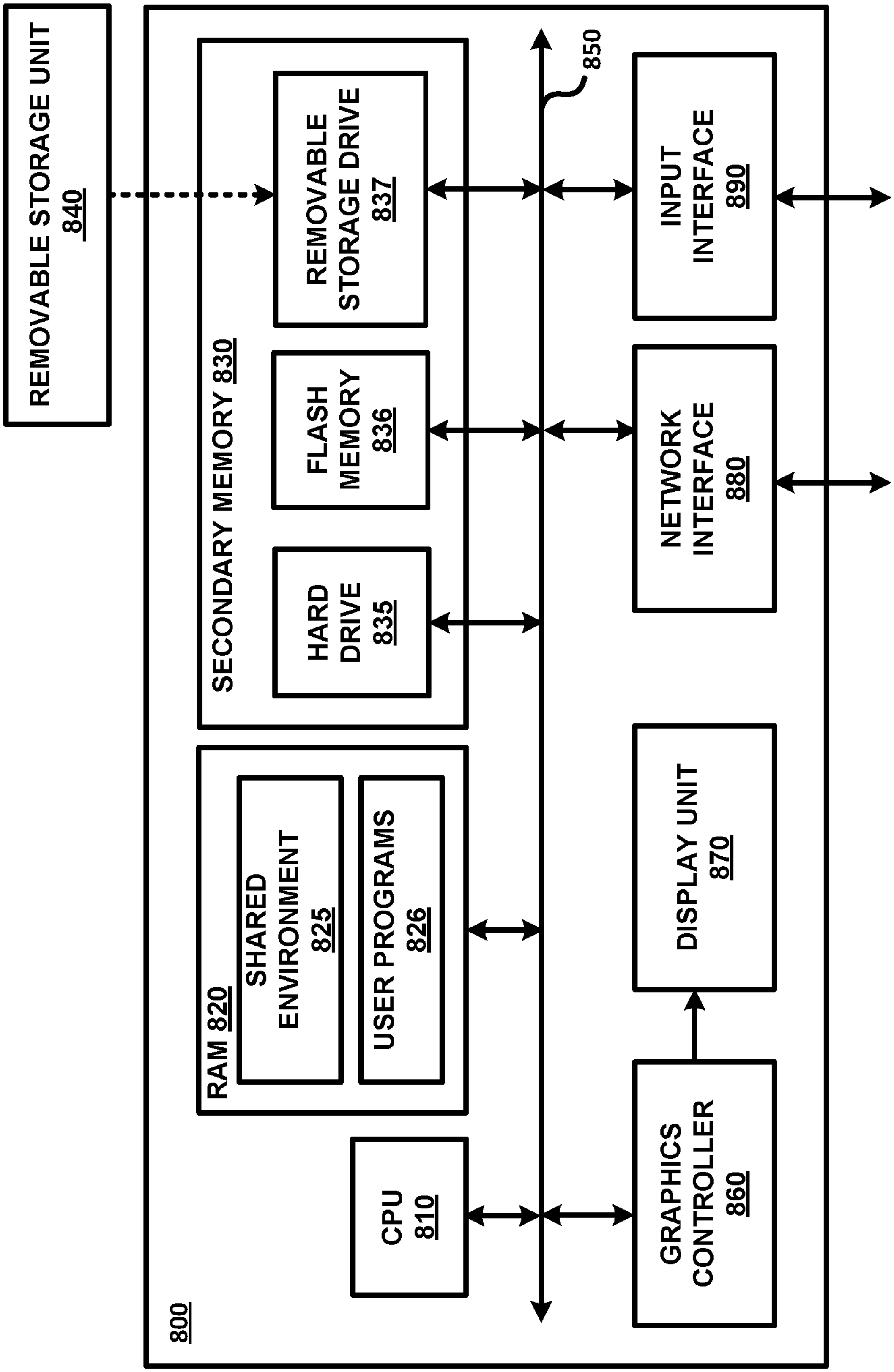
FIG. 8 is a block diagram illustrating the details of digital processing system in which various aspects of the present disclosure are operative by execution of appropriate executable modules.

FIG. 8 is a block diagram illustrating the details of digital processing system 800 in which various aspects of the present disclosure are operative by execution of appropriate executable modules. Digital processing system 800 may correspond to orchestrator 150.

Digital processing system 800 may contain one or more processors such as a central processing unit (CPU) 810, random access memory (RAM) 820, secondary memory 830, graphics controller 860, display unit 870, network interface 880, and input interface 890. All the components except display unit 870 may communicate with each other over communication path 850, which may contain several buses as is well known in the relevant arts. The components of FIG. 8 are described below in further detail.

CPU 810 may execute instructions stored in RAM 820 to provide several features of the present disclosure. CPU 810 may contain multiple processing units, with each processing unit potentially being designed for a specific task. Alternatively, CPU 810 may contain only a single general-purpose processing unit.

RAM 820 may receive instructions from secondary memory 830 using communication path 850. RAM 820 is shown currently containing software instructions constituting shared environment 825 and/or other user programs 826 (such as other applications, DBMS, etc.). In addition to shared environment 825, RAM 820 may contain other software programs such as device drivers, virtual machines, etc., which provide a (common) run time environment for execution of other/user programs.

Graphics controller 860 generates display signals (e.g., in RGB format) to display unit 870 based on data/instructions received from CPU 810. Display unit 870 contains a display screen to display the images defined by the display signals (for example, portions of the user interface shown in FIGS. 6A-6E and 7A-7G). Input interface 890 may correspond to a keyboard and a pointing device (e.g., touch-pad, mouse) and may be used to provide inputs (for example, in the portions of the user interface shown in FIGS. 6A-6D and 7A-7F). Network interface 880 provides connectivity to a network (e.g., using Internet Protocol), and may be used to communicate with other systems (of FIG. 1) connected to the networks (120).

Secondary memory 830 may contain hard drive 835, flash memory 836, and removable storage drive 837. Secondary memory 830 may store the data (for example, data portions shown in FIGS. 6A-6E and 7A-7G) and software instructions (for example, for implementing the various features of the present disclosure as shown in FIG. 3, etc.), which enable digital processing system 800 to provide several features in accordance with the present disclosure. The code/instructions stored in secondary memory 830 may either be copied to RAM 820 prior to execution by CPU 810 for higher execution speeds, or may be directly executed by CPU 810.

Some or all of the data and instructions may be provided on removable storage unit 840, and the data and instructions may be read and provided by removable storage drive 837 to CPU 810. Removable storage unit 840 may be implemented using medium and storage format compatible with removable storage drive 837 such that removable storage drive 837 can read the data and instructions. Thus, removable storage unit 840 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 840 or hard disk installed in hard drive 835. These computer program products are means for providing software to digital processing system 800. CPU 810 may retrieve the software instructions, and execute the instructions to provide various features of the present disclosure described above.

The term "storage media/medium" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage memory 830. Volatile media includes dynamic memory, such as RAM 820. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 850. Transmission media can also take the form of acoustic or light waves, such as those generated during radio-wave and infra-red data communications.

Reference throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

Furthermore, the described features, structures, or characteristics of the disclosure may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the disclosure.

11. Conclusion

While various embodiments of the present disclosure have been described above, it should be understood that they have been presented by way of example only, and not limitation. Thus, the breadth and scope of the present disclosure should not be limited by any of the above-described exemplary embodiments, but should be defined only in accordance with the following claims and their equivalents.

It should be understood that the figures and/or screen shots illustrated in the attachments highlighting the functionality and advantages of the present disclosure are presented for example purposes only. The present disclosure is sufficiently flexible and configurable, such that it may be utilized in ways other than that shown in the accompanying figures.

Further, the purpose of the following Abstract is to enable the Patent Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present disclosure in any way.

What is claimed is:

1. A method performed in a digital processing system, said method comprising:

enabling a user to specify individual tasks in an execution order as a task-group;

receiving said task-group and a condition, said task-group specifying a plurality of tasks;

selecting a group of resources satisfying said condition, said group of resources being comprised in a tenant cloud spanning a plurality of cloud infrastructures; and invoking each task of said plurality of tasks in said execution order on each resource of said group of resources to perform a corresponding management operation on the resource such that all of said plurality of tasks are executed on each resource of said group of resources, wherein said invoking of each task on each resource comprises executing corresponding operations on the resource by issuing commands corresponding to the task to the resource over a network coupling said digital processing system to said plurality of cloud infrastructures, and wherein all resources of said group of resources are provisioned for said tenant cloud prior to said invoking, whereby, prior to said invoking, said group of resources are allocated to and are part of said tenant cloud, and execute user applications in said tenant cloud to be operative in said tenant cloud.

2. The method of claim 1, wherein a tentative condition is received at a first time instance, said method further comprising:

sending for display, immediately upon receipt of said tentative condition, a set of resources satisfying said tentative condition, whereby said user is facilitated to refine said tentative condition iteratively until specifying a last refined tentative condition as said condition as a basis for said selecting of said group of resources.

3. The method of claim 2, wherein said invoking comprises executing some of said plurality of tasks concurrently on respective sub-groups of said group of resources.

4. The method of claim 1, wherein said invoking is performed at a second time instance after a first time instance at which said condition is received, said method further comprises:

retrieving, prior to said first time instance, attribute-value pairs characterizing each of a first plurality of resources in a first cloud infrastructure and a second plurality of resources in a second cloud infrastructure, said first cloud infrastructure and said second cloud infrastructure being contained in said plurality of cloud infrastructures, wherein said retrieving comprises sending a first request and a second request over said network to said first cloud infrastructure and said second cloud infrastructure respectively, wherein said attribute-value pairs are received in response to said sending, wherein each attribute-value pair comprises an attribute-identifier specifying an identifier of an attribute of the resource, and an attribute-value specifying the value of said attribute of the resource, wherein said condition contains a condition-key specifying an identifier of said attribute, a condition-value indicating a desired value of said attribute, and a logic operator specifying a relationship that is required to be satisfied, wherein said selecting comprises examining each attribute-value pair of said attribute-value pairs against said condition, to select said group of resources satisfying said condition, wherein said condition is deemed to be satisfied if an attribute-identifier of said attribute-value pair matches said condition-key and an attribute-value of said attribute-value pair matches said condition-value, wherein said group of resources comprises a first resource and a second resource respectively contained in said first plurality of resources and said second plurality of resources.

5. The method of claim 4, wherein said selecting is performed just prior to said second time instance such that said group of resources is selected dynamically for each invocation.

6. The method of claim 4, wherein said selecting is performed in response to said receipt of condition at said first time instance, wherein said selecting further comprises receiving inputs from said user to exclude a sub-set of resources matching said condition in forming said group of resources such that said group of resources is determined statically for each invocation.

7. The method of claim 6, wherein a second task of said plurality of tasks is defined to update a value of a first attribute-value pair, wherein said examining thereafter operates based on said updated value.

8. The method of claim 4, further comprising:

performing said retrieving at a sequence of pre-determined time points;

storing locally in a data store said attribute-value pairs retrieved at each timepoint of said sequence of pre-determined time points, wherein said examining is based on the locally stored attribute-value pairs.

9. The method of claim 4, wherein said attribute-value pairs comprise a first attribute identifying a first configuration information of resources, wherein said first attribute is identified using a first attribute-identifier in said first cloud infrastructure, wherein said first attribute is identified using a second attribute-identifier in said second cloud infrastructure, wherein said first attribute is stored in said attribute-value pairs using said first attribute-identifier when storing attribute-value pairs of said first cloud infrastructure and using said second attribute-identifier when storing attribute-value pairs of said second cloud infrastructure, wherein said condition corresponding to said first configuration information is specified by said user using a third attribute-identifier corresponding commonly to both of said first attribute-identifier and said second attribute-identifier, wherein to select said group of resources satisfying said condition specifying said third attribute-identifier, said selecting comprises issuing to said data store, a first query using said first attribute-identifier and issuing a second query using said second attribute-identifier.

10. The method of claim 1, wherein said receiving receives a first task in addition to said plurality of tasks in said task-group along with specification of a first position of execution of said first task included into said execution order, wherein said first task is further specified to be executed on a first group of resources, wherein said invoking further invokes said first task at said first position only on each resource of said first group of resources but not on said group of resources.

11. An orchestrator system comprising:

one or more memories for storing instructions; and one or more processors, wherein execution of the instructions by the one or more processors causes the orchestrator system to perform the actions of:

enabling a user to specify individual tasks in an execution order as a task-group;

receiving said ask-group and a condition, said task-group specifying a plurality of tasks;

selecting a group of resources satisfying said condition, said group of resources being comprised in a tenant cloud spanning a plurality of cloud infrastructures; and invoking each task of said plurality of tasks in said execution order on each resource of said group of resources to perform a corresponding management operation on the resource such that all of said plurality of tasks are executed on each resource of said group of resources, wherein said invoking of each task on each resource comprises executing corresponding operations on the resource by issuing commands corresponding to the task to the resource over a network coupling said digital processing system to said plurality of cloud infrastructures, and wherein all resources of said group of resources are provisioned for said tenant cloud prior to said invoking, whereby, prior to said invoking, said group of resources are allocated to and are part of said tenant cloud, and execute user applications in said tenant cloud to be operative in said tenant cloud.

12. The orchestrator system of claim 11, wherein a tentative condition is received at a first time instance, said actions further comprising:

sending for display, immediately upon receipt of said tentative condition, a set of resources satisfying said tentative condition, whereby said user is facilitated to refine said tentative condition iteratively until specifying a last refined tentative condition as said condition as a basis for said selecting of said group of resources.

13. The orchestrator system of claim 11, wherein said invoking is performed at a second time instance after a first time instance at which said condition is received, said actions further comprising:

retrieving, prior to said first time instance, attribute-value pairs characterizing each of a first plurality of resources in a first cloud infrastructure and a second plurality of resources in a second cloud infrastructure, said first cloud infrastructure and said second cloud infrastructure being contained in said plurality of cloud infrastructures, wherein said retrieving comprises sending a first request and a second request over said network to said first cloud infrastructure and said second cloud infrastructure respectively, wherein said attribute-value pairs are received in response to said sending, wherein each attribute-value pair comprises an attribute-identifier specifying an identifier of an attribute of the resource, and an attribute-value specifying the value of said attribute of the resource, wherein said condition contains a condition-key specifying an identifier of said attribute, a condition-value indicating a desired value of said attribute, and a logic operator specifying a relationship that is required to be satisfied, wherein said selecting comprises examining each attribute-value pair of said attribute-value pairs against said condition, to select said group of resources satisfying said condition, wherein said condition is deemed to be satisfied if an attribute-identifier of said attribute-value pair matches said condition-key and an attribute-value of said attribute-value pair matches said condition-value, wherein said group of resources comprises a first resource and a second resource respectively contained in said first plurality of resources and said second plurality of resources.

14. The orchestrator system of claim 13, wherein said selecting is performed just prior to said second time instance such that said group of resources is selected dynamically for each invocation.

15. The orchestrator system of claim 13, wherein said selecting is performed in response to said receipt of condition at said first time instance, wherein said selecting further comprises receiving inputs from said user to exclude a sub-set of resources matching said condition in forming said group of resources such that said group of resources is determined statically for each invocation.

16. The orchestrator system of claim 15, wherein a second task of said plurality of tasks is defined to update a value of a first attribute-value pair, wherein said examining thereafter operates based on said updated value.

17. The orchestrator system of claim 13, further comprising:

performing said retrieving at a sequence of pre-determined time points;

storing locally in a data store said attribute-value pairs retrieved at each timepoint of said sequence of pre-determined time points, wherein said examining is based on the locally stored attribute-value pairs.

18. The orchestrator system of claim 13, wherein said attribute-value pairs comprise a first attribute identifying a first configuration information of resources, wherein said first attribute is identified using a first attribute-identifier in said first cloud infrastructure, wherein said first attribute is identified using a second attribute-identifier in said second cloud infrastructure, wherein said first attribute is stored in said attribute-value pairs using said first attribute-identifier when storing attribute-value pairs of said first cloud infrastructure and using said second attribute-identifier when storing attribute-value pairs of said second cloud infrastructure, wherein said condition corresponding to said first configuration information is specified by said user using a third attribute-identifier corresponding commonly to both of said first attribute-identifier and said second attribute-identifier, wherein to select said group of resources satisfying said condition specifying said third attribute-identifier, said selecting comprises issuing to said data store, a first query using said first attribute-identifier and issuing a second query using said second attribute-identifier.

19. The orchestrator system of claim 11, wherein said receiving receives a first task in addition to said plurality of tasks in said task-group along with specification of a first position of execution of said first task included into said execution order, wherein said first task is further specified to be executed on a first group of resources, wherein said invoking further invokes said first task at said first position only on each resource of said first group of resources but not on said group of resources.

20. A non-transitory machine readable medium storing one or more sequences of instructions for causing an orchestrator system to orchestrate tasks in tenant clouds, wherein execution of said one or more instructions by one or more processors contained in said orchestrator system causes performance of the actions of:

enabling a user to specify individual tasks in an execution order as a task-group;

receiving said task-group and a condition, said task-group specifying a plurality of tasks;

selecting a group of resources satisfying said condition, said group of resources being comprised in a tenant cloud spanning a plurality of cloud infrastructures; and invoking each task of said plurality of tasks in said execution order on each resource of said group of resources to perform a corresponding management operation on the resource such that all of said plurality of tasks are executed on each resource of said group of resources, wherein said invoking of each task on each resource comprises executing corresponding operations on the resource by issuing commands corresponding to the task to the resource over a network coupling said digital processing system to said plurality of cloud infrastructures, and wherein all resources of said group of resources are provisioned for said tenant cloud prior to said invoking, whereby, prior to said invoking, said group of resources are allocated to and are part of said tenant cloud, and execute user applications in said tenant cloud to be operative in said tenant cloud.

21. The non-transitory machine readable medium of claim 20, wherein a tentative condition is received at a first time instance, the actions further comprising:

sending for display, immediately upon receipt of said tentative condition, a set of resources satisfying said tentative condition, whereby said user is facilitated to refine said tentative condition iteratively until specifying a last refined tentative condition as said condition as a basis for said selecting of said group of resources.

22. The non-transitory machine readable medium of claim 20, wherein said invoking is performed at a second time instance after a first time instance at which said condition is received, the actions further comprising:

retrieving, prior to said first time instance, attribute-value pairs characterizing each of a first plurality of resources in a first cloud infrastructure and a second plurality of resources in a second cloud infrastructure, said first cloud infrastructure and said second cloud infrastructure being contained in said plurality of cloud infrastructures, wherein said retrieving comprises sending a first request and a second request over said network to said first cloud infrastructure and said second cloud infrastructure respectively, wherein said attribute-value pairs are received in response to said sending, wherein each attribute-value pair comprises an attribute-identifier specifying an identifier of an attribute of the resource, and an attribute-value specifying the value of said attribute of the resource, wherein said condition contains a condition-key specifying an identifier of said attribute, a condition-value indicating a desired value of said attribute, and a logic operator specifying a relationship that is required to be satisfied, wherein said selecting comprises examining each attribute-value pair of said attribute-value pairs against said condition, to select said group of resources satisfying said condition, wherein said condition is deemed to be satisfied if an attribute-identifier of said attribute-value pair matches said condition-key and an attribute-value of said attribute- value pair matches said condition-value, wherein said group of resources comprises a first resource and a second resource respectively contained in said first plurality of resources and said second plurality of resources.

23. The non-transitory machine readable medium of claim 20, wherein said receiving receives a first task in addition to said plurality of tasks in said task-group along with specification of a first position of execution of said first task included into said execution order, wherein said first task is further specified to be executed on a first group of resources, wherein said invoking further invokes said first task at said first position only on each resource of said first group of resources but not on said group of resources.

* * * * *